US010455071B2

(12) United States Patent
Burcham et al.

(10) Patent No.: US 10,455,071 B2
(45) Date of Patent: Oct. 22, 2019

(54) SELF-IDENTIFICATION OF BRAND AND BRANDED FIRMWARE INSTALLATION IN A GENERIC ELECTRONIC DEVICE

(75) Inventors: Robert H. Burcham, Overland Park, KS (US); M. Jeffrey Stone, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1159 days.

(21) Appl. No.: 13/468,028

(22) Filed: May 9, 2012

(65) Prior Publication Data

US 2013/0303142 A1 Nov. 14, 2013

(51) Int. Cl.
| | |
|---|---|
| *H04M 1/725* | (2006.01) |
| *H04W 4/80* | (2018.01) |
| *H04W 84/18* | (2009.01) |
| *H04W 4/02* | (2018.01) |
| *H04W 4/12* | (2009.01) |
| *H04W 4/50* | (2018.01) |

(52) U.S. Cl.
CPC ... *H04M 1/72525* (2013.01); *H04M 1/72575* (2013.01); *H04W 4/80* (2018.02); *H04M 2250/04* (2013.01); *H04W 4/02* (2013.01); *H04W 4/12* (2013.01); *H04W 4/50* (2018.02); *H04W 84/18* (2013.01)

(58) Field of Classification Search
CPC ....... H04W 4/02; H04W 12/06; H04W 12/08; H04W 24/10; H04W 4/006; H04W 4/008; H04W 4/023; H04W 4/025; H04W 52/0212; H04W 52/04; H04W 64/00; H04W 64/003; H04W 64/006; H04W 76/02; H04W 8/18; H04W 8/24; H04W 4/12; H04W 4/14

USPC ............................ 455/418; 235/383; 705/14
See application file for complete search history.

(56) References Cited

U.S. PATENT DOCUMENTS

| | | |
|---|---|---|
| 6,131,024 A | 10/2000 | Boltz |
| 6,445,914 B1 | 9/2002 | Findikli et al. |
| (Continued) | | |

FOREIGN PATENT DOCUMENTS

| | | |
|---|---|---|
| DE | 112016000711 T5 | 11/2017 |
| EP | 2079256 A1 | 7/2009 |
| (Continued) | | |

OTHER PUBLICATIONS

Foreign Communication from a Related Counterpart—International Search Report and Written Opinion, PCT/US2011/063736.
(Continued)

*Primary Examiner* — Natasha W Cosme

(57) ABSTRACT

A mobile phone that is delivered by an original equipment manufacturer in an unbranded state. The mobile phone comprises a near-field-communication radio transceiver, a memory, a processor, and an application stored in the memory. When executed by the processor, the application reads brand information, using the near-field-communication radio transceiver, from a radio frequency identity (RFID) tag coupled to the mobile phone during an order fulfillment process in a distribution center of a communication service provider and, based on the brand information, loads brand firmware into the memory, whereby the mobile phone presents a branded look and feel.

20 Claims, 9 Drawing Sheets

(56) References Cited

U.S. PATENT DOCUMENTS

| | | | |
|---|---|---|---|
| 6,753,887 B2 * | 6/2004 | Carolan | ............ H04L 12/2801 709/219 |
| 6,889,040 B1 | 5/2005 | Koo et al. | |
| 6,963,908 B1 | 11/2005 | Lynch et al. | |
| 7,027,773 B1 | 4/2006 | McMillin | |
| 7,165,191 B1 | 1/2007 | Vakrat | |
| 7,260,382 B1 | 8/2007 | Lamb et al. | |
| 7,266,371 B1 | 9/2007 | Amin et al. | |
| 7,409,208 B1 | 8/2008 | Clare et al. | |
| 7,493,111 B2 | 2/2009 | Knowles | |
| 7,530,079 B2 | 5/2009 | Stubbs et al. | |
| 7,817,988 B2 | 10/2010 | Kruis et al. | |
| 7,904,895 B1 | 3/2011 | Cassapakis et al. | |
| 7,991,988 B2 | 8/2011 | Chen | |
| 8,107,926 B2 | 1/2012 | Goto | |
| 8,185,097 B2 | 5/2012 | Vanderlinden et al. | |
| 8,185,101 B1 | 5/2012 | Wiseman et al. | |
| 8,249,654 B1 | 8/2012 | Zhu | |
| 8,260,281 B2 | 9/2012 | Urbanek | |
| 8,401,538 B2 | 3/2013 | Urbanek | |
| 8,401,595 B2 | 3/2013 | Zhu et al. | |
| 8,433,953 B1 | 4/2013 | Gaudette et al. | |
| 8,442,521 B2 | 5/2013 | Fleischman et al. | |
| 8,468,164 B1 | 6/2013 | Paleja et al. | |
| 8,522,343 B2 | 8/2013 | Hernacki | |
| 8,571,536 B2 | 10/2013 | Urbanek | |
| 8,612,967 B1 | 12/2013 | Delker | |
| 8,626,165 B1 | 1/2014 | Narasimhan et al. | |
| 8,639,245 B2 | 1/2014 | Shi et al. | |
| 8,666,383 B1 | 3/2014 | Mauer et al. | |
| 8,699,377 B2 | 4/2014 | Veillette | |
| 8,819,188 B2 | 8/2014 | Blatherwick et al. | |
| 8,825,039 B2 | 9/2014 | Mizuguchi | |
| 8,855,012 B1 | 10/2014 | Suri | |
| 8,909,211 B2 | 12/2014 | Huq et al. | |
| 8,909,291 B1 | 12/2014 | Spanel et al. | |
| 8,938,436 B2 | 1/2015 | Kozempel | |
| 8,965,366 B1 | 2/2015 | Somayajula et al. | |
| 9,020,479 B1 | 4/2015 | Somayajula et al. | |
| 9,026,105 B2 | 5/2015 | Shipley et al. | |
| 9,042,877 B1 | 5/2015 | Ghoshal et al. | |
| 9,098,368 B1 | 8/2015 | Delker | |
| 9,100,769 B2 | 8/2015 | Annan et al. | |
| 9,100,819 B1 | 8/2015 | Annan et al. | |
| 9,124,719 B2 | 9/2015 | Inlow et al. | |
| 9,125,037 B2 | 9/2015 | Masterson et al. | |
| 9,143,924 B1 | 9/2015 | Abou-El-Ella et al. | |
| 9,161,209 B1 | 10/2015 | Ghoshal et al. | |
| 9,161,325 B1 | 10/2015 | Urbanek | |
| 9,170,870 B1 | 10/2015 | Masterson et al. | |
| 9,198,027 B2 | 11/2015 | Urbanek | |
| 9,204,239 B1 | 12/2015 | Sumner | |
| 9,204,286 B1 | 12/2015 | Annan et al. | |
| 9,208,513 B1 | 12/2015 | Mauer et al. | |
| 9,226,133 B1 | 12/2015 | Spanel et al. | |
| 9,280,483 B1 | 3/2016 | Ghoshal et al. | |
| 9,301,081 B1 | 3/2016 | Callan et al. | |
| 9,304,668 B2 | 4/2016 | Rezende et al. | |
| 9,307,400 B1 | 4/2016 | Blinn et al. | |
| 9,313,643 B1 | 4/2016 | Ghoshal et al. | |
| 9,319,270 B2 | 4/2016 | Bestmann et al. | |
| 9,357,378 B1 | 5/2016 | Delker et al. | |
| 9,363,622 B1 | 6/2016 | Ahn et al. | |
| 9,392,395 B1 | 7/2016 | Indurkar | |
| 9,398,462 B1 | 7/2016 | Delker et al. | |
| 9,420,399 B2 | 8/2016 | Urbanek | |
| 9,420,496 B1 | 8/2016 | Indurkar | |
| 9,426,641 B1 | 8/2016 | Ghoshal et al. | |
| 9,439,025 B1 | 9/2016 | Ghoshal et al. | |
| 9,451,446 B2 | 9/2016 | Spanel et al. | |
| 9,532,211 B1 | 12/2016 | Sumner | |
| 9,549,009 B1 | 1/2017 | Annan et al. | |
| 9,603,009 B1 | 3/2017 | Indurkar | |
| 9,681,251 B1 | 6/2017 | Ahn et al. | |
| 9,743,271 B2 | 8/2017 | Urbanek | |
| 9,794,727 B1 | 10/2017 | Delker et al. | |
| 9,913,132 B1 | 3/2018 | Ghoshal et al. | |
| 9,992,326 B1 | 6/2018 | Koller et al. | |
| 10,021,240 B1 | 7/2018 | Goshal et al. | |
| 10,306,433 B1 | 5/2019 | Indurkar et al. | |
| 2002/0091931 A1 | 7/2002 | Quick, Jr. et al. | |
| 2002/0142783 A1 | 10/2002 | Yoldi et al. | |
| 2003/0023514 A1 | 1/2003 | Adler et al. | |
| 2003/0031235 A1 * | 2/2003 | Kim | .................... H04B 1/3816 375/147 |
| 2003/0060896 A9 | 3/2003 | Hulai et al. | |
| 2003/0081621 A1 | 5/2003 | Godfrey et al. | |
| 2003/0188160 A1 | 10/2003 | Sunder et al. | |
| 2003/0217145 A1 | 11/2003 | Leung et al. | |
| 2004/0033798 A1 | 2/2004 | Robin et al. | |
| 2004/0092248 A1 | 5/2004 | Kelkar et al. | |
| 2004/0093109 A1 | 5/2004 | O'Connor et al. | |
| 2004/0116163 A1 | 6/2004 | Kim et al. | |
| 2004/0122907 A1 | 6/2004 | Chou et al. | |
| 2004/0137890 A1 | 7/2004 | Kalke | |
| 2004/0137891 A1 | 7/2004 | Clark et al. | |
| 2004/0254975 A1 | 12/2004 | Teh et al. | |
| 2004/0261041 A1 | 12/2004 | Parakkuth et al. | |
| 2005/0020308 A1 | 1/2005 | Lai | |
| 2005/0079855 A1 | 4/2005 | Jethi et al. | |
| 2005/0079863 A1 | 4/2005 | Macaluso | |
| 2005/0085222 A1 | 4/2005 | Przybilski et al. | |
| 2005/0114114 A1 | 5/2005 | Rudolph | |
| 2005/0119001 A1 | 6/2005 | Watanabe | |
| 2005/0164737 A1 | 7/2005 | Brown | |
| 2005/0188262 A1 | 8/2005 | Rosenman et al. | |
| 2005/0197098 A1 | 9/2005 | Trossen | |
| 2005/0203703 A1 | 9/2005 | Chang | |
| 2005/0253717 A1 | 11/2005 | Howarth et al. | |
| 2005/0253718 A1 | 11/2005 | Droms et al. | |
| 2006/0025151 A1 | 2/2006 | Karaoguz et al. | |
| 2006/0121894 A1 | 6/2006 | Ganesan | |
| 2006/0126620 A1 | 6/2006 | Bonar et al. | |
| 2006/0135144 A1 | 6/2006 | Jothipragasam | |
| 2006/0154651 A1 | 7/2006 | Knowles | |
| 2006/0190980 A1 | 8/2006 | Kikkoji et al. | |
| 2006/0203722 A1 | 9/2006 | Oommen | |
| 2006/0208071 A1 * | 9/2006 | Chang et al. | .................. 235/383 |
| 2006/0235944 A1 | 10/2006 | Haslam | |
| 2006/0236325 A1 | 10/2006 | Rao et al. | |
| 2006/0242150 A1 | 10/2006 | Jogand-Coulomb et al. | |
| 2006/0246949 A1 | 11/2006 | Gupta et al. | |
| 2007/0004404 A1 | 1/2007 | Buckley et al. | |
| 2007/0015538 A1 | 1/2007 | Wang | |
| 2007/0043667 A1 | 2/2007 | Qawami et al. | |
| 2007/0082655 A1 | 4/2007 | Link, II et al. | |
| 2007/0099599 A1 | 5/2007 | Smith et al. | |
| 2007/0129057 A1 | 6/2007 | Xu et al. | |
| 2007/0130156 A1 | 6/2007 | U. Tenhunen et al. | |
| 2007/0130286 A1 | 6/2007 | Hopmann et al. | |
| 2007/0165654 A1 | 7/2007 | Chai et al. | |
| 2007/0169084 A1 | 7/2007 | Frank et al. | |
| 2007/0190939 A1 | 8/2007 | Abel | |
| 2007/0192854 A1 | 8/2007 | Kelley et al. | |
| 2007/0197234 A1 | 8/2007 | Gill et al. | |
| 2007/0250645 A1 | 10/2007 | Meadows et al. | |
| 2007/0254635 A1 | 11/2007 | Montelius | |
| 2008/0022395 A1 | 1/2008 | Holtzman et al. | |
| 2008/0039114 A1 | 2/2008 | Phatak et al. | |
| 2008/0046583 A1 | 2/2008 | Rao | |
| 2008/0046880 A1 | 2/2008 | Jun et al. | |
| 2008/0046997 A1 | 2/2008 | Wang | |
| 2008/0051076 A1 | 2/2008 | OShaughnessy et al. | |
| 2008/0057957 A1 | 3/2008 | Altbaum et al. | |
| 2008/0062900 A1 | 3/2008 | Rao | |
| 2008/0065753 A1 | 3/2008 | Rao | |
| 2008/0109662 A1 | 5/2008 | Natarajan et al. | |
| 2008/0146280 A1 | 6/2008 | Sasse et al. | |
| 2008/0155275 A1 | 6/2008 | Natarajan et al. | |
| 2008/0160970 A1 | 7/2008 | Srinivas Reddy et al. | |
| 2008/0167027 A1 | 7/2008 | Gautier et al. | |
| 2008/0171532 A1 | 7/2008 | Shieh et al. | |
| 2008/0188210 A1 | 8/2008 | Choi et al. | |
| 2008/0225806 A1 | 9/2008 | Arian et al. | |

(56) References Cited

U.S. PATENT DOCUMENTS

| | | |
|---|---|---|
| 2008/0276182 A1 | 11/2008 | Leow |
| 2008/0281511 A1 | 11/2008 | Miyata |
| 2008/0298559 A1 | 12/2008 | Nanjundaswamy |
| 2008/0300967 A1 | 12/2008 | Buckley et al. |
| 2008/0318547 A1 | 12/2008 | Ballou, Jr. et al. |
| 2009/0036165 A1* | 2/2009 | Brede ............... H04L 63/0853 455/558 |
| 2009/0061840 A1* | 3/2009 | Fleischman et al. ......... 455/419 |
| 2009/0075592 A1* | 3/2009 | Nystrom ............. G06Q 20/327 455/41.1 |
| 2009/0093242 A1 | 4/2009 | Bhalekar et al. |
| 2009/0094350 A1 | 4/2009 | Rive et al. |
| 2009/0106200 A1 | 4/2009 | Salinas et al. |
| 2009/0124250 A1 | 5/2009 | Topaltzas et al. |
| 2009/0156190 A1 | 6/2009 | Fisher |
| 2009/0156209 A1 | 6/2009 | Franklin et al. |
| 2009/0217385 A1 | 8/2009 | Teow et al. |
| 2009/0239518 A1 | 9/2009 | Feuillette |
| 2009/0247124 A1 | 10/2009 | de Atley et al. |
| 2009/0259974 A1 | 10/2009 | Lin |
| 2009/0260004 A1 | 10/2009 | Datta et al. |
| 2009/0307763 A1 | 12/2009 | Rawlins et al. |
| 2010/0048193 A1 | 2/2010 | Ortion et al. |
| 2010/0060456 A1 | 3/2010 | Forster |
| 2010/0075669 A1 | 3/2010 | Sparks et al. |
| 2010/0080143 A1 | 4/2010 | Topaltzas et al. |
| 2010/0133335 A1* | 6/2010 | Maguid et al. ............... 235/380 |
| 2010/0136960 A1 | 6/2010 | Knezevic |
| 2010/0138652 A1 | 6/2010 | Sela et al. |
| 2010/0159876 A1 | 6/2010 | Brown et al. |
| 2010/0159954 A1 | 6/2010 | Rahman et al. |
| 2010/0161724 A1 | 6/2010 | Sathyan et al. |
| 2010/0161928 A1 | 6/2010 | Sela et al. |
| 2010/0167696 A1 | 7/2010 | Smith et al. |
| 2010/0185434 A1 | 7/2010 | Burvall et al. |
| 2010/0190479 A1 | 7/2010 | Scott et al. |
| 2010/0192120 A1 | 7/2010 | Raleigh |
| 2010/0194632 A1 | 8/2010 | Raento et al. |
| 2010/0198939 A1 | 8/2010 | Raleigh |
| 2010/0203864 A1 | 8/2010 | Howard |
| 2010/0207742 A1 | 8/2010 | Buhot et al. |
| 2010/0222031 A1 | 9/2010 | Carolan et al. |
| 2010/0222047 A1* | 9/2010 | Vanderlinden et al. ...... 455/418 |
| 2010/0250368 A1 | 9/2010 | Porco |
| 2010/0262638 A1 | 10/2010 | Fitzgerald |
| 2010/0291898 A1 | 11/2010 | Sanding et al. |
| 2010/0311391 A1 | 12/2010 | Siu et al. |
| 2010/0311404 A1 | 12/2010 | Shi et al. |
| 2010/0311468 A1 | 12/2010 | Shi et al. |
| 2010/0312794 A1 | 12/2010 | Liu |
| 2010/0325622 A1 | 12/2010 | Morton |
| 2010/0332639 A1 | 12/2010 | Diaz et al. |
| 2011/0003590 A1 | 1/2011 | Yoon et al. |
| 2011/0014913 A1 | 1/2011 | Yoon et al. |
| 2011/0026501 A1 | 2/2011 | Sharaga et al. |
| 2011/0028138 A1 | 2/2011 | Davies-Moore et al. |
| 2011/0030062 A1 | 2/2011 | Hsu et al. |
| 2011/0035421 A1 | 2/2011 | Laird-McConnell et al. |
| 2011/0069702 A1 | 3/2011 | Oktay et al. |
| 2011/0081885 A1 | 4/2011 | Sennett et al. |
| 2011/0086611 A1 | 4/2011 | Klein et al. |
| 2011/0119716 A1 | 5/2011 | Coleman, Sr. |
| 2011/0136482 A1 | 6/2011 | Kaliner |
| 2011/0138074 A1 | 6/2011 | Onda et al. |
| 2011/0161659 A1 | 6/2011 | Himawan et al. |
| 2011/0165836 A1 | 7/2011 | Dixon et al. |
| 2011/0165839 A1 | 7/2011 | Dixon et al. |
| 2011/0173685 A1 | 7/2011 | Chai et al. |
| 2011/0202233 A1 | 8/2011 | Hatton |
| 2011/0202680 A1 | 8/2011 | Bells et al. |
| 2011/0202976 A1 | 8/2011 | Chow et al. |
| 2011/0208338 A1 | 8/2011 | Eteminan et al. |
| 2011/0208865 A1 | 8/2011 | Knowles et al. |
| 2011/0222404 A1 | 9/2011 | Watson et al. |
| 2011/0230136 A1 | 9/2011 | Washiro |
| 2011/0258249 A1 | 10/2011 | Biggs et al. |
| 2011/0263294 A1 | 10/2011 | Kim et al. |
| 2011/0294484 A1 | 12/2011 | Martin et al. |
| 2011/0296399 A1 | 12/2011 | Tugnawat et al. |
| 2011/0306318 A1 | 12/2011 | Rodgers et al. |
| 2011/0314129 A1 | 12/2011 | Rezaiifar et al. |
| 2012/0027059 A1 | 2/2012 | Zhao et al. |
| 2012/0030512 A1 | 2/2012 | Wadhwa et al. |
| 2012/0035989 A1 | 2/2012 | Abel et al. |
| 2012/0036282 A1 | 2/2012 | Chen et al. |
| 2012/0046022 A1 | 2/2012 | Kalke et al. |
| 2012/0047227 A1 | 2/2012 | Haggerty et al. |
| 2012/0054022 A1 | 3/2012 | Kosashvili |
| 2012/0077546 A1 | 3/2012 | Kawa et al. |
| 2012/0079084 A1 | 3/2012 | Forssell et al. |
| 2012/0094684 A1 | 4/2012 | Reddy |
| 2012/0106509 A1 | 5/2012 | Klingenbrunn et al. |
| 2012/0129513 A1 | 5/2012 | van der Laak |
| 2012/0129572 A1 | 5/2012 | Johnstone et al. |
| 2012/0135733 A1 | 5/2012 | Cormier et al. |
| 2012/0142314 A1 | 6/2012 | Mohammed |
| 2012/0151199 A1 | 6/2012 | Shriver |
| 2012/0158580 A1 | 6/2012 | Eram et al. |
| 2012/0203824 A1 | 8/2012 | Oommen |
| 2012/0208511 A1 | 8/2012 | Vanderlinden et al. |
| 2012/0230587 A1 | 9/2012 | Arseneau |
| 2012/0260095 A1 | 10/2012 | Von Hauck et al. |
| 2012/0276872 A1 | 11/2012 | Knauth et al. |
| 2012/0282891 A1 | 11/2012 | Mohammed et al. |
| 2012/0282924 A1 | 11/2012 | Tagg et al. |
| 2012/0309377 A1 | 12/2012 | De Atley et al. |
| 2013/0010641 A1 | 1/2013 | Dinan |
| 2013/0013671 A1 | 1/2013 | Relan et al. |
| 2013/0023235 A1 | 1/2013 | Fan et al. |
| 2013/0031191 A1 | 1/2013 | Bott |
| 2013/0031234 A1 | 1/2013 | Alfano et al. |
| 2013/0031541 A1 | 1/2013 | Wilks et al. |
| 2013/0041988 A1 | 2/2013 | Rodermund et al. |
| 2013/0046951 A1 | 2/2013 | Jones |
| 2013/0065557 A1 | 3/2013 | Zhang et al. |
| 2013/0065578 A1 | 3/2013 | Raleigh et al. |
| 2013/0072168 A1 | 3/2013 | Colucciello et al. |
| 2013/0080911 A1 | 3/2013 | Klemm |
| 2013/0085914 A1 | 4/2013 | McPherson et al. |
| 2013/0111461 A1 | 5/2013 | Zubas et al. |
| 2013/0124186 A1 | 5/2013 | Donabedian et al. |
| 2013/0137417 A1 | 5/2013 | Urbanek |
| 2013/0184029 A1 | 7/2013 | Lim et al. |
| 2013/0196647 A1 | 8/2013 | Raleigh et al. |
| 2013/0198567 A1 | 8/2013 | Ahmed et al. |
| 2013/0222395 A1 | 8/2013 | Blas, Jr. |
| 2013/0275560 A1 | 10/2013 | Bestmann et al. |
| 2013/0281085 A1 | 10/2013 | Sen et al. |
| 2013/0295902 A1 | 11/2013 | Justen et al. |
| 2013/0310003 A1 | 11/2013 | Sadhvani et al. |
| 2013/0311836 A1 | 11/2013 | Hurst et al. |
| 2013/0318518 A1 | 11/2013 | Paalanen et al. |
| 2013/0326359 A1 | 12/2013 | Beckert et al. |
| 2014/0024332 A1 | 1/2014 | Droste et al. |
| 2014/0045483 A1 | 2/2014 | Whidden |
| 2014/0068779 A1 | 3/2014 | Tan et al. |
| 2014/0074955 A1 | 3/2014 | Beattie, Jr. et al. |
| 2014/0075567 A1 | 3/2014 | Raleigh et al. |
| 2014/0080467 A1 | 3/2014 | Urbanek |
| 2014/0092775 A1 | 4/2014 | Goldman |
| 2014/0099916 A1 | 4/2014 | Mallikarjunan et al. |
| 2014/0113610 A1 | 4/2014 | Ramprasad et al. |
| 2014/0115058 A1 | 4/2014 | Yin et al. |
| 2014/0122563 A1 | 5/2014 | Singh et al. |
| 2014/0134981 A1 | 5/2014 | Park et al. |
| 2014/0140507 A1 | 5/2014 | Park et al. |
| 2014/0206313 A1 | 7/2014 | Spanel et al. |
| 2014/0213233 A1 | 7/2014 | Parry et al. |
| 2014/0228012 A1 | 8/2014 | Annan et al. |
| 2014/0228042 A1 | 8/2014 | Annan et al. |
| 2014/0274032 A1 | 9/2014 | Shipley et al. |
| 2014/0337752 A1 | 11/2014 | Cammarata |
| 2014/0342715 A1 | 11/2014 | Gu et al. |
| 2014/0373184 A1 | 12/2014 | Mahaffey et al. |

(56) References Cited

U.S. PATENT DOCUMENTS

| | | |
|---|---|---|
| 2015/0011311 A1 | 1/2015 | Relan et al. |
| 2015/0017962 A1 | 1/2015 | Howard et al. |
| 2015/0033291 A1 | 1/2015 | Nicolau |
| 2015/0040246 A1 | 2/2015 | Yuen et al. |
| 2015/0065105 A1 | 3/2015 | Masterson et al. |
| 2015/0071268 A1 | 3/2015 | Kennedy et al. |
| 2015/0094041 A1 | 4/2015 | Jung et al. |
| 2015/0111564 A1 | 4/2015 | Urbanek |
| 2015/0111565 A1 | 4/2015 | Urbanek |
| 2015/0133094 A1 | 5/2015 | Lindeman et al. |
| 2015/0193217 A1 | 7/2015 | Xiang et al. |
| 2015/0220245 A1 | 8/2015 | Wojcik et al. |
| 2015/0242336 A1 | 8/2015 | Loreskar et al. |
| 2015/0271662 A1 | 9/2015 | Lhamon et al. |
| 2015/0304506 A1 | 10/2015 | Zhu et al. |
| 2015/0312873 A1 | 10/2015 | Cormier et al. |
| 2015/0319178 A1 | 11/2015 | Desai et al. |
| 2015/0331590 A1 | 11/2015 | Yasui |
| 2015/0370428 A1 | 12/2015 | Chan et al. |
| 2016/0029204 A1 | 1/2016 | Lalwaney |
| 2016/0044091 A1 | 2/2016 | Doumet |
| 2016/0094931 A1 | 3/2016 | Urbanek |
| 2016/0105843 A1 | 4/2016 | Xue et al. |
| 2016/0165645 A1 | 6/2016 | Commons et al. |
| 2016/0234675 A1 | 8/2016 | Ghoshal et al. |
| 2016/0239317 A1 | 8/2016 | Cuddihy et al. |
| 2016/0255493 A1 | 9/2016 | Lihosit et al. |
| 2017/0150435 A1 | 5/2017 | Tagg et al. |
| 2017/0295450 A1 | 10/2017 | Urbanek |

FOREIGN PATENT DOCUMENTS

| | | | |
|---|---|---|---|
| EP | 2461613 A1 | 6/2012 | |
| EP | 2765794 A1 | 8/2014 | |
| GB | 2292047 A | 2/1996 | |
| GB | 2548038 A | 9/2017 | |
| JP | H11-94923 | 4/1999 | |
| JP | 2006-20256 A | 1/2006 | |
| JP | 201285272 A | 4/2012 | |
| JP | 2012-527206 A | 11/2012 | |
| JP | 2012-529857 A1 | 11/2012 | |
| JP | 2015505190 A | 2/2015 | |
| JP | 5924347 B2 | 4/2015 | |
| JP | 6270066 B2 | 1/2018 | |
| JP | 6273585 B2 | 1/2018 | |
| JP | 6277455 B2 | 1/2018 | |
| JP | 6288654 B2 | 2/2018 | |
| JP | 6387579 B2 | 8/2018 | |
| JP | 6443452 | 12/2018 | |
| JP | 6493922 | 3/2019 | |
| KR | 2006039974 A | 5/2006 | |
| WO | WO2007066413 A1 | 6/2007 | |
| WO | WO2010135257 A1 | 11/2010 | |
| WO | WO2011159549 A1 | 12/2011 | |
| WO | 2012078753 A1 | 6/2012 | |
| WO | 2013169983 A1 | 11/2013 | |
| WO | WO2014020237 A1 | 2/2014 | |
| WO | 2014046814 A1 | 3/2014 | |
| WO | WO2014113128 A1 | 7/2014 | |
| WO | WO2014123758 A1 | 8/2014 | |
| WO | WO2014123759 A1 | 8/2014 | |
| WO | WO2014158430 A1 | 9/2014 | |
| WO | WO2015030945 A1 | 3/2015 | |
| WO | WO2015060965 A2 | 4/2015 | |
| WO | WO2016130266 A1 | 8/2016 | |

OTHER PUBLICATIONS

Notice of Allowance dated Apr. 26, 2012, U.S. Appl. No. 12/962,620, filed Dec. 7, 2010.
Notice of Allowance dated Nov. 2, 2012, U.S. Appl. No. 13/556,202, filed Jul. 24, 2012.
First Action Interview Pre-Interview Communication dated Feb. 25, 2013, U.S. Appl. No. 13/149,505, filed May 31, 2013.
First Action Interview Office Action dated May 8, 2013, U.S. Appl. No. 13/149,505, filed May 31, 2013.
Urbanek, Robert E., "System and Method of Wireless Communication", filed Dec. 7, 2010, U.S. Appl. No. 12/962,620.
Urbanek, Robert E., "System and Method for Generic Mobile Phone Configuration", filed Jul. 24, 2012, U.S. Appl. No. 13/556,202.
Urbanek, Robert E., "System and Method for Generic Mobile Phone Configuration", filed Jan. 28, 2013, U.S. Appl. No. 13/752,386.
Delker, Jason R., "Loading Branded Media Outside System Partition", filed May 31, 2011 U.S. Appl. No. 13/149,505.
Mauer, Brian D., et al., "Automatic Branding of Generic Applications", filed Dec. 23, 2011 U.S. Appl. No. 13/335,941.
Urbanek, Robert E., "Generic Mobile Devices Customization Framework", filed Sep. 18, 2012, U.S. Appl. No. 13/622,234.
Annan, Brandon C., et al.,"System and Method of Branding and Labeling a Mobile Device", filed Mar. 15, 2013, U.S. Appl. No. 13/844,104.
Annan, Brandon C., et al.,"System and Method of Storing Service Brand Packages on a Mobile Device", filed Feb. 8, 2013, U.S. Appl. No. 13/763,428.
Annan, Brandon C., et al.,"System and Method of Provisioning and Reprovisioning a Mobile Device Based on Self-locating", filed Feb. 8, 2013, U.S. Appl. No. 13/763,434.
Annan, Brandon C., et al.,"Electronic Fixed Brand Labeling", filed Feb. 8, 2013, U.S. Appl. No. 13/763,443.
Ghoshal, Jagannath, et al.,"Rebranding a Portable Electronic Device While Maintaining User Data", filed May 22, 2013, U.S. Appl. No. 13/899,567.
Ghoshal, Jagannath, et al.,"System and Method for Retrofitting a Branding Framework into a Mobile Communication Device", filed May 21, 2013, U.S. Appl. No. 13/899,566.
Notice of Allowance dated Oct. 9, 2013, U.S. Appl. No. 13/335,941, filed Dec. 23, 2011.
Delker, Jason R., "Loading Branded Media Outside System Partition", filed Oct. 30, 2013 U.S. Appl. No. 14/066,947.
Foreign Communication from a Related Counterpart—International Search Report and Written Opinion, dated Nov. 14, 2013, PCT/US13/55023, filed on Aug. 15, 2013.
Mauer, Brian D., et al., "Automatic Branding of Generic Applications", filed Jan. 10, 2013, U.S. Appl. No. 14/152,627.
Urbanek, Robert E., "Generic Mobile Devices Customization Framework", filed Aug. 15, 2013, International Serial No. PCT/US13/55023.
Annan, Brandon C., et al.,"System and Method of Storing Service Brand Packages on a Mobile Device", filed Jan. 30, 2014, International Serial No. PCT/US14/13936.
Annan, Brandon C., et al.,"System and Method of Provisioning and Reprovisioning a Mobile Device Based on Self-locating", filed filed Jan. 30, 2014, International Serial No. PCT/US14/13939.
Foreign Communication from a Related Counterpart Application, "Preliminary Report on Patentability", dated Jun. 20, 2013, PCT/US2011/063736 filed on Dec. 7, 2011.
Foreign Communication from a Related Counterpart—International Search Report and Written Opinion, dated Jul. 24, 2013, PCT/US13/40278, filed on May 9, 2013.
Notice of Allowance dated Jun. 21, 2013, U.S. Appl. No. 13/752,386, filed Jan. 28, 2013.
Notice of Allowance dated Aug. 9, 2013, U.S. Appl. No. 13/149,505, filed May 31, 2013.
First Action Interview Pre-Interview Communication dated Aug. 13, 2013, U.S. Appl. No. 13/335,941, filed Dec. 23, 2011.
Foreign Communication from a Related Counterpart—International Search Report and Written Opinion, dated May 19, 2014, PCT/US14/13936, filed on Jan. 30, 2014.
Foreign Communication from a Related Counterpart—International Search Report and Written Opinion, dated May 14, 2014, PCT/US14/13939, filed on Jan. 30, 2014.
First Action Interview Pre-Interview Communication dated Apr. 23, 2014, U.S. Appl. No. 13/622,234, filed Sep. 18, 2012.
First Action Interview Pre-Interview Communication dated Apr. 3, 2014, U.S. Appl. No. 13/763,434, filed Feb. 8, 2013.
Final Office Action dated Sep. 19, 2014, U.S. Appl. No. 13/622,234, filed Sep. 18, 2012.

(56) References Cited

OTHER PUBLICATIONS

FAIPP Pre-Interview Communication dated Mar. 19, 2014, U.S. Appl. No. 13/744,847, filed Jan. 18, 2013.
Notice of Allowance dated Aug. 4, 2014, U.S. Appl. No. 13/744,847, filed Jan. 18, 2013.
FAIPP Pre-Interview Communication dated Jul. 16, 2014, U.S. Appl. No. 13/744,861, filed Jan. 18, 2013.
Final Office Action dated Aug. 19, 2014, U.S. Appl. No. 13/763,434, filed Feb. 8, 2013.
Office Action dated Aug. 7, 2014, U.S. Appl. No. 13/831,504, filed Mar. 14, 2013.
Foreign Communication From a Related Counterpart Application, International Search Report and Written Opinion dated Jan. 24, 2014, International Application No. PCT/US13/68981 filed on Nov. 7, 2013.
Spanel, Robert L., et al., Patent Application entitled "Dynamic Remotely Managed SIM Profile" U.S. Appl. No. 13/744,847, filed Jan. 18, 2013.
Urbanek, Robert E., "Delivery of Branding Content and Customizations to a Mobile Communication Device", filed Oct. 23, 2013, U.S. Appl. No. 14/060,712.
Urbanek, Robert E., "Delivery of Branding Content and Customizations to a Mobile Communication Device", filed , 201, International Serial No. PCT/US14/56778.
Urbanek, Robert E., "Implementation of Remotely Hosted Branding Content and Customizations", filed Oct. 23, 2013, U.S. Appl. No. 14/085,474.
Urbanek, Robert E., "Subscriber Identity Module Virtualization", filed Nov. 20, 2013, U.S. Appl. No. 14/060,719.
Indurkar, Dhananjay, "System and Method of Branding a Device Independent of Device Activation", filed Jan. 24, 2014, U.S. Appl. No. 14/163,035.
Sumner, Bret D., "Directing Server Connection Based on Location Identifier", filed Aug. 15, 2013, U.S. Appl. No. 13/968,259.
Abou-El-Ella, Hassan, et al., "Segmented Customization Payload Delivery", filed Aug. 27, 2013, U.S. Appl. No. 14/010,518.
Sumner, Bret D., "Segmented Customization Package Within Distributed Server Architecture", filed Aug. 27, 2013, U.S. Appl. No. 14/010,522.
Masterson, Michelle E., et al., "Development and Testing of Payload Receipt by a Portable Electronic Device", filed Aug. 27, 2013, U.S. Appl. No. 14/010,523.
Masterson, Michelle E., et al., "System and Methods for Deferred and Remote Device Branding", filed Aug. 27, 2013, U.S. Appl. No. 14/010,524.
Masterson, Michelle E., et al., "System and Methods for Deferred and Remote Device Branding", filed Jul. 16 , 2014, International Serial No. PCT/US14/46773.
Callan, Jeffery S., et al., "Delivery of Oversized Branding Elements for Customization", filed Nov. 6, 2013, U.S. Appl. No. 14/073,321.
Indurkar, Dhananjay, "Background Delivery of Device Configuration and Branding", filed Jan. 16, 2014, U.S. Appl. No. 14/157,507.
Ahn, Chul Jin, et al., "Separation of Client Identification Composition from Customization Payload to Original Equipment Manufacturer Layer", filed Nov. 8, 2013, U.S. Appl. No. 14/075,687.
Ghoshal, Jagannath, et al., "Multiple Carrier Partition Dynamic Access on a Mobile Device", filed Jun. 5, 2014, U.S. Appl. No. 14/297,429.
Indurkar, Dhananjay, "Activation Sequence Using Permission Based Connection to Network", filed Jan. 24, 2014, U.S. Appl. No. 14/163,041.
Ahn, Chul Jin, et al., "Customization for Preloaded Applications", filed Mar. 31, 2014, U.S. Appl. No. 14/231,718.
Foreign Communication from a Related Counterpart—International Search Report and Written Opinion, dated Jun. 3, 2014,PCT/US14/16650, filed on Feb. 16, 2014.
Advisory Action dated Dec. 17, 2014, U.S. Appl. No. 13/622,234, filed Sep. 18, 2012.
Notice of Allowance dated Nov. 22, 2014, U.S. Appl. No. 13/744,861, filed Jan. 18, 2013.

First Action Interview Pre-Interview Communication dated Oct. 22, 2014, U.S. Appl. No. 13/763,428, filed Feb. 8, 2013.
Notice of Allowance dated Dec. 29, 2014, U.S. Appl. No. 13/831,504, filed Mar. 14, 2013.
First Action Interview Pre-Interview Communication dated Nov. 20, 2014, filed on May 21, 2013.
Foreign Communication from a Related Counterpart Application, "Preliminary Report on Patentability," dated Nov. 20, 2014, PCT/US13/40278 filed on May 9, 2013.
Foreign Communication from a Related Counterpart—International Search Report and Written Opinion, dated Dec. 17, 2014, PCT/US14/46773, filed on Jul. 16, 2014.
Foreign Communication from a Related Counterpart—International Search Report and Written Opinion, dated Dec. 30, 2014, PCT/US14/56778, filed Sep. 22, 2014.
Spanel, Robert L., et al., Patent Application entitled "Dynamic Remotely Managed SIM Profile" U.S. Appl. No. 14/522,586, filed Oct. 24, 2014.
Urbanek, Robert E., "Delivery of Branding Content and Customizations to a Mobile Communication Device", filed Sep. 22, 2014, International Serial No. PCT/US14/56778.
Koller, Gary D., et al., "Out of the Box Experience (OOBE) Country Choice Using Wi-Fi Layer Transmission," filed Oct. 31, 2014, U.S. Appl. No. 14/530,666.
Blinn, Benjamin P., et al. "System and Method of Efficient Mobile Device Network Brand Customization," filed Sep. 2, 2014, U.S. Appl. No. 14/475,399.
FAIPP Pre-Interview Communication dated Jun. 2, 2015, U.S. Appl. No. 14/152,627, filed Jan. 10, 2013.
Notice of Allowance dated Jul. 7, 2015, U.S. Appl. No. 14/522,586, filed Oct. 24, 2014.
FAIPP Pre-Interview Communication dated Apr. 23, 2014, U.S. Appl. No. 13/763,443, filed Feb. 8, 2013.
First Action Interview Office Action dated Jun. 16, 2014, U.S. Appl. No. 131763,443, filed Feb. 8, 2013.
Office Action dated Jun. 16, 2015, U.S. Appl. No. 13/899,567, filed May 22, 2013.
Notice of Allowance dated May 7, 2015, U.S. Appl. No. 13/972,827, filed Aug. 21, 2013.
Notice of Allowance dated May 29, 2015, U.S. Appl. No. 14/085,474, filed Nov. 20, 2013.
Notice of Allowance dated May 8, 2015, U.S. Appl. No. 14/010,518, filed Aug. 27, 2013.
Notice of Allowance dated Jul. 8, 2015, U.S. Appl. No. 14/010,522, filed Aug. 27, 2013.
Notice of Allowance dated Jun. 26, 2015, U.S. Appl. No. 14/010,523, filed Aug. 27, 2013.
Notice of Allowance dated Apr. 28, 2015, U.S. Appl. No. 14/010,524, filed Aug. 27, 2013.
Restriction Requirement dated May 21, 2015, U.S. Appl. No. 14/073,321, filed Nov. 6, 2013.
FAIPP Pre-Interview Communication dated Jul. 8, 2015, U.S. Appl. No. 14/475,399, filed Sep. 2, 2014.
Amazon Kindle e-book reader, on public sale 2007, http://en.wikipedia.org/wiki/Amazon_Kindle. last accessed on Apr. 13, 2015.
Foreign Office Action dated Jul. 7, 2015, Japanese Application Serial No. 2013-543310, filed Jul. 7, 2015.
Notice of Allowance dated Aug. 6, 2015, U.S. Appl. No. 14/152,627, filed Jan. 10, 2013.
Notice of Allowance dated Jul. 15, 2015, U.S. Appl. No. 13/622,234, filed Sep. 18, 2012.
Notice of Allowance dated Jul. 16, 2015, U.S. Appl. No. 13/844,104, filed Mar. 15, 2013.
Final Office Action dated Aug. 10, 2015, U.S. Appl. No. 13/763,443, filed Feb. 8, 2013.
FAIPP Pre-Interview Communication dated Sep. 29, 2015, U.S. Appl. No. 14/163,035, filed Jan. 24, 2014.
FAIPP Pre-Interview Communication dated Aug. 20, 2015, U.S. Appl. No. 14/073,321, filed Nov. 6, 2013.
FAIPP Pre-Interview Communication dated Jul. 15, 2015, U.S. Appl. No. 14/163,041, filed Jan. 24, 2014.
FAIPP Pre-Interview Communication dated Sep. 21, 2015, U.S. Appl. No. 14/231,718, filed Mar. 31, 2014.

(56) References Cited

OTHER PUBLICATIONS

Foreign Communication From a Related Counterpart Application, International Preliminary Report on Patentability dated Jul. 30, 2015, PCT/US13/68981, filed on Nov. 7, 2013.
Foreign Communication From a Related Counterpart Application, International Preliminary Report on Patentability dated Aug. 20, 2015, PCT/US14/13936, filed on Jan. 30, 2014.
Foreign Communication From a Related Counterpart Application, International Preliminary Report on Patentability dated Aug. 20, 2015, PCT/US14/13939, filed on Jan. 30, 2014.
Foreign Communication From a Related Counterpart Application, International Preliminary Report on Patentability dated Sep. 24, 2015, PCT/US14/16650, filed on Feb. 16, 2014.
Dummies, "Power Modes on Your Kindle Paperwhite", http://dummies.com/how-to/content/power-modes-on-your-kindle-paperwhite.html, last accessed on Jul. 31, 2015.
Cushings, "Buy Your Kindle at Waterstones? You're Now Locked Into One Sceensaver . . . The Waterstones Logo", https://www.techdirt.com/articles/20121206/16014421285/buy-your-kindle-waterstones-youre-now-locked-into-one-screensaver-waterstones-logo.shtml, last accessed Aug. 3, 2015.
Wikipedia, Extended Display Identification Data, https://en.wikipedia.org/wiki/Extended_Display_Identification_Data, last accessed Aug. 5, 2015.
Office Action dated Mar. 2, 2015, U.S. Appl. No. 13/622,234, filed Sep. 18, 2012.
FAIPP Pre-Interview Communication dated Mar. 26, 2015, U.S. Appl. No. 14/522,586, filed Oct. 24, 2014.
FAIPP Pre-Interview Communication dated Apr. 8, 2015, U.S. Appl. No. 13/844,104, filed Mar. 15, 2013.
Notice of Allowance dated Mar. 20, 2015, U.S. Appl. No. 13/763,428, filed Feb. 8, 2013.
Notice of Allowance dated Mar. 26, 2015, U.S. Appl. No. 13/763,434, filed Feb. 8, 2013.
FAIPP Pre-Interview Communication dated Mar. 12, 2015, U.S. Appl. No. 13/972,827, filed Aug. 21, 2013.
Notice of Allowance dated Jan. 22, 2015, U.S. Appl. No. 13/899,566, filed May 21, 2013.
FAIPP Pre-Interview Communication dated Apr. 15, 2015, U.S. Appl. No. 14/060,712, filed Nov. 20, 2013.
FAIPP Pre-Interview Communication dated Mar. 4, 2015, U.S. Appl. No. 14/010,518, filed Aug. 27, 2013.
FAIPP Pre-Interview Communication dated Apr. 1, 2015, U.S. Appl. No. 14/010,522, filed Aug. 27, 2013.
FAIPP Pre-Interview Communication dated Apr. 3, 2015, U.S. Appl. No. 14/010,523, filed Aug. 27, 2013.
FAIPP Pre-Interview Communication dated Mar. 10, 2015, U.S. Appl. No. 14/010,524, filed Aug. 27, 2013.
FAIPP Pre-Interview Communication dated Apr. 8, 2015, U.S. Appl. No. 14/157,507, filed Jan. 16, 2014.
Foreign Communication from a Related Counterpart—International Preliminary Report on Patentability, dated Apr. 2, 2015, PCT/US13/55023, filed on Aug. 15, 2013.
Ghoshal, Jagannath, et al., "Multi-Step Mobile Device Initiation with Intermediate Partial Reset," filed Aug. 21, 2013, U.S. Appl. No. 13/972,827.
Delker, Jason R., et al. "Subscriber Identity Module (SIM) Card Initiation of Custom Application Launcher Installation on a Mobile Communication Device," filed Mar. 4, 2015, U.S. Appl. No. 14/639,056.
Delker, Jason R., et al. "Network Access Tiered Based on Application Launcher Installation," filed Mar. 4, 2015, U.S. Appl. No. 14/639,060.
Advisory Action dated Nov. 3, 2015, U.S. Appl. No. 13/763,443, filed Feb. 8, 2013.
Notice of Allowance dated Oct. 26, 2015, U.S. Appl. No. 13/899,567, filed May 22, 2013.
FAIPP Pre-Interview Communication dated Oct. 16, 2015, U.S. Appl. No. 14/060,712, filed Oct. 23, 2013.
FAIPP Pre-Interview Communication dated Nov. 2, 2015, U.S. Appl. No. 14/060,719, filed Oct. 23, 2013.
First Action Interview Office Action dated Dec. 14, 2015, U.S. Appl. No. 14/060,719, filed Oct. 23, 2013.
Notice of Allowance dated Nov. 4, 2015, U.S. Appl. No. 14/073,321, filed Nov. 6, 2013.
First Action Interview Office Action dated Oct. 16, 2015, U.S. Appl. No. 14/157,507, filed Jan. 16, 2014.
FAIPP Pre-Interview Communication dated Oct. 7, 2015, U.S. Appl. No. 14/075,687, filed Nov. 8, 2013.
FAIPP Pre-Interview Communication dated Nov. 19, 2015, U.S. Appl. No. 14/297,429, filed Jun. 5, 2014.
Notice of Allowance dated Dec. 4, 2015, U.S. Appl. No. 14/475,399, filed Sep. 2, 2014.
Supplemental Notice of Allowability dated Dec. 14, 2015, U.S. Appl. No. 14/475,399, filed Sep. 2, 2014.
Urbanek, Robert E., "Generic Mobile Devices Customization Framework," filed Oct. 7, 2015, U.S. Appl. No. 14/877,215.
FAIPP Pre-Interview Communication dated Nov. 4, 2015, U.S. Appl. No. 14/619,677, filed Feb. 11, 2015.
Notice of Allowance dated Dec. 11, 2015, U.S. Appl. No. 14/619,677, filed Feb. 11, 2015.
Notice of Allowance dated Apr. 13, 2016, U.S. Appl. No. 14/877,215, filed Oct. 7, 2015.
EP Search Report dated May 17, 2016, European Application No. 14749499.1, filed on Feb. 8, 2013.
Office Action dated May 3, 2016, U.S. Appl. No. 13/763,443, filed Feb. 8, 2013.
Notice of Allowance dated May 6, 2016, U.S. Appl. No. 14/820,522, filed Aug. 6, 2015.
Advisory Action dated May 3, 2016, U.S. Appl. No. 14/060,712, filed Oct. 23, 2013.
Advisory Action dated Apr. 20, 2016, U.S. Appl. No. 14/060,719, filed Oct. 23, 2013.
Office Action dated Jun. 6, 2016, U.S. Appl. No. 14/060,719, filed Oct. 23, 2013.
Office Action dated May 10, 2016, U.S. Appl. No. 14/163,035, filed Jan. 24, 2014.
Final Office Action dated Jun. 14, 2016, U.S. Appl. No. 13/968,259, filed Aug. 15, 2013.
Notice of Allowance dated Apr. 20, 2016, U.S. Appl. No. 14/297,429, filed Jun. 5, 2014.
Notice of Allowance dated Apr. 13, 2016, U.S. Appl. No. 14/163,041, filed Jan. 24, 2014.
Final Office Action dated Apr. 19, 2016, U.S. Appl. No. 14/231,718, filed Mar. 31, 2014.
Advisory Action dated Jun. 28, 2016, U.S. Appl. No. 14/231,718, filed Mar. 31, 2014.
Benjamin, Jeff, "How to change your iPhone carrier logo without jailbreaking," idownloadblog.com, Dec. 31, 2012.
Wikipedia, "Motorola Fone," Mar. 21, 2016.
Mobile Gazette, Motorola Fone F3 Review, www.mobilegazette.com, Sep. 16, 2007.
Delker, Jason R., et al. "Network Access Tiered Based on Application Launcher Installation," filed May 25, 2016, U.S. Appl. No. 15/164,530.
Foreign Notice of Allowance dated Mar. 21, 2016, Japanese Application Serial No. 2013-543310, filed Jul. 7, 2015.
FAIPP Pre-Interview Communication dated Jan. 11, 2016, U.S. Appl. No. 14/877,215, filed Oct. 7, 2015.
FAIPP Pre-Interview Communication dated Feb. 25, 2016, U.S. Appl. No. 14/820,522, filed Aug. 6, 2015.
Final Office Action dated Mar. 9, 2016, U.S. Appl. No. 14/060,712, filed Oct. 23, 2013.
Final Office Action dated Feb. 24, 2016, U.S. Appl. No. 14/060,719, filed Oct. 23, 2013.
Final Office Action dated Feb. 16, 2016, U.S. Appl. No. 14/163,035, filed Jan. 24, 2014.
FAIPP Pre-Interview Communication dated Mar. 16, 2016, U.S. Appl. No. 13/968,259, filed Aug. 15, 2013.
Notice of Allowance dated Feb. 25, 2016, U.S. Appl. No. 14/157,507, filed Jan. 16, 2014.
Notice of Allowance dated Jan. 27, 2016, U.S. Appl. No. 14/075,687, filed Nov. 8, 2013.

(56) References Cited

OTHER PUBLICATIONS

First Action Interview Office Action dated Feb. 2, 2016, U.S. Appl. No. 14/297,429, filed Jun. 5, 2014.
Final Office Action dated Jan. 12, 2016, U.S. Appl. No. 14/163,041, filed Jan. 24, 2014.
First Action Interview Office Action dated Jan. 19, 2016, U.S. Appl. No. 14/231,718, filed Mar. 31, 2014.
Notice of Allowance dated Feb. 3, 2016, U.S. Appl. No. 14/639,056, filed Mar. 4, 2015.
Notice of Allowance dated Mar. 11, 2016, U.S. Appl. No. 14/639,060, filed Mar. 4, 2015.
Foreign Communication from a Related Counterpart—International Preliminary Report on Patentability, dated Mar. 10, 2016, PCT/US14/46773, filed on Jul. 16, 2014.
Foreign Communication from a Related Counterpart—International Search Report and Written Opinion, dated Apr. 4, 2016, PCT/US16/13272, filed on Jan. 13, 2016.
Ghoshal, Jagannath, et al., "Dynamic Subscriber Identity Module," filed Feb. 11, 2015, U.S. Appl. No. 14/619,677.
Ghoshal, Jagannath, et al., "Dynamic Subscriber Identity Module," filed Jan. 13, 2016, International Serial No. PCT/US16/13272.
Ghoshal, Jagannath, et al., "Dynamic Subscriber Identity Module," filed Mar. 7, 2016, U.S. Appl. No. 15/063,383.
EP Search Report dated Jul. 7, 2016, European Application Serial No. 13871478.7 filed on Jan. 18, 2013.
EP Search Report dated Aug. 24, 2015, European Application Serial No. 14749462.9, filed on Feb. 8, 2013.
Notice of Allowance dated Sep. 12, 2016, U.S. Appl. No. 13/763,443, filed Feb. 8, 2013.
Notice of Allowance dated Aug. 18, 2016, U.S. Appl. No. 13/968,259, filed Aug. 15, 2013.
Office Action dated Oct. 6, 2016, U.S. Appl. No. 14/231,718, filed Mar. 31, 2014.
Yota Devices, "Hands-on with the YotaPhone: the e-ink Android phone that nobody expected," New York Times, 2010.
Ghoshal, Jagannath, et al., "System and Method of Mobile Phone Customization Based on Universal Manifest with Feature Override," filed Sep. 16, 2016, U.S. Appl. No. 15/268,347.
Ghoshal, Jagannath, et al., "System and Method of Mobile Phone Customization Based on Universal Manifest," filed Sep. 14, 2016, U.S. Appl. No. 15/265,833.
EP Notice of Intention to Grant dated May 26, 2017, European Application No. 14749499.1, filed on Feb. 8, 2013.
Final Office Action dated May 30, 2017, U.S. Appl. No. 14/530,666, filed Oct. 31, 2014.
Advisory Action dated Aug. 10, 2017, U.S. Appl. No. 14/530,666, filed Oct. 31, 2014.
Notice of Allowance dated Jun. 14, 2017, U.S. Appl. No. 15/164,530, filed May 25, 2016.
Office Action dated May 31, 2017, U.S. Appl. No. 15/265,833, filed Sep. 14, 2016.
Urbanek, Robert E., "Delivery of Branding Content and Customizations to a Mobile Communication Device," filed Jun. 26, 2017, U.S. Appl. No. 15/633,737.
Indurkar, Dhananjay, "Mobile Phone Differentiated Set-Up," filed May 1, 2017, U.S. Appl. No. 15/584,001.
EP Search Report dated Oct. 12, 2016, EP International Application No. 11847301.6, filed on Jun. 20, 2013.
Office Action dated Dec. 29, 2016, U.S. Appl. No. 14/060,712, filed Oct. 23, 2013.
Notice of Allowance dated Nov. 2, 2016, U.S. Appl. No. 14/163,035, filed Jan. 24, 2014.
FAIPP Pre-Interview Communication dated Nov. 4, 2016, U.S. Appl. No. 14/530,666, filed Oct. 31, 2014.
Japanese Office Action dated Apr. 13, 2017, JP Application Serial No. 2015-531933; filed on Feb. 16, 2015.
Notice of Allowance dated Apr. 17, 2017, U.S. Appl. No. 14/060,712, filed Oct. 23, 2013.
Final Office Action dated Jan. 26, 2017, U.S. Appl. No. 14/060,719, filed Oct. 23, 2013.

Advisory Action dated Mar. 24, 2017, U.S. Appl. No. 14/060,719, filed Oct. 23, 2013.
Notice of Allowance dated Feb. 21, 2017, U.S. Appl. No. 14/231,718, filed Mar. 31, 2014.
FAIPP Office Action dated Jan. 31, 2017, U.S. Appl. No. 14/530,666, filed Oct. 31, 2014.
FAIPP Pre-Interview Communication dated Apr. 10, 2017, U.S. Appl. No. 15/164,530, filed May 25, 2016.
JP Office Action dated Mar. 28, 2017, JP Application Serial No. 2015-511682; filed on Oct. 15, 2014.
JP Decision to Grant dated Dec. 5, 2017, JP Application Serial No. 2015-511682; filed on Oct. 15, 2014.
JP Decision to Grant dated Dec. 12, 2017, JP Application Serial No. 2015-531933; filed on Feb. 16, 2015.
JP Office Action dated Apr. 10, 2018, JP Application No. 2016-550459, filed on Feb. 25, 2016.
JP Office Action dated Aug. 7, 2018, JP Application No. 2016-550459, filed on Feb. 25, 2016.
JP Office Action dated Oct. 30, 2018, Japanese Application Serial No. 2015-556972; filed on Jun. 25, 2015.
JP Decision for Grant dated Oct. 30, 2018, JP Application No. 2016-550459, filed on Feb. 25, 2016.
Final Office Action dated Oct. 25, 2018, U.S. Appl. No. 15/584,001, filed May 1, 2017.
Advisory Action dated Dec. 21, 2018, U.S. Appl. No. 15/584,001, filed May 1, 2017.
Japanese Decision for Grant dated Jan. 9, 2018, Japanese Application Serial No. 2015-553721; filed on Jan. 18, 2013.
Japanese Decision for Grant dated Dec. 19, 2017, Japanese Application Serial No. 2015-556971; filed on Jun. 24, 2015.
Final Office Action dated Jan. 18, 2018, U.S. Appl. No. 15/063,383, filed Mar. 7, 2016.
FAIPP Pre-Interview Communication dated Dec. 28, 2107, U.S. Appl. No. 15/268,347, filed Sep. 16, 2016.
Notice of Allowance dated Feb. 13, 2018, U.S. Appl. No. 14/530,666, filed Oct. 31, 2014.
Japanese Office Action dated Feb. 28, 2018, Japanese Application Serial No. 2015-556972; filed on Jun. 25, 2015.
Office Action dated Mar. 13, 2018, U.S. Appl. No. 15/584,001, filed May 1, 2017.
Notice of Allowance dated Mar. 22, 2018, U.S. Appl. No. 15/268,347, filed Sep. 16, 2016.
Japanese Final Office Action dated Aug. 23, 2017, JP Application Serial No. 2015-531933; filed on Feb. 16, 2015.
Japanese Office Action dated Sep. 6, 2017, Japanese Application Serial No. 2015-553721, filed on Jan. 18, 2013.
Examiners Answer dated Aug. 28, 2017, U.S. Appl. No. 14/060,719, filed Oct. 23, 2013.
Office Action dated Oct. 5, 2017, U.S. Appl. No. 14/530,666, filed Oct. 31, 2014.
FAIPP Pre-Interview Communication dated Sep. 6, 2017, U.S. Appl. No. 15/063,383, filed Mar. 7, 2016.
FAIPP Office Action dated Oct. 16, 2017, U.S. Appl. No. 15/063,383, filed Mar. 7, 2016.
Notice of Allowance dated Oct. 27, 2017, U.S. Appl. No. 15/265,833, filed Sep. 14, 2016.
Foreign Communication from a Related Counterpart—International Preliminary Report on Patentability, dated Aug. 24, 2017, PCT/US16/13272, filed on Jan. 13, 2016.
EP Exam Report dated May 25, 2018, EP International Application No. 11847301.6, filed on Jun. 20, 2013.
EP Exam Report dated Dec. 14, 2017, European Application Serial No. 13871478.7 filed on Jan. 18, 2013.
EP Second Exam Report dated Jun. 15, 2018, European Application Serial No. 13871478.7 filed on Jan. 18, 2013.
JP Office Action dated Apr. 6, 2018, JP Application No. 2016-538920, filed on Mar. 3, 2016.
Decision to Grant dated Jul. 16, 2018, JP Application No. 2016-538920, filed on Mar. 3, 2016.
Examiner's Answer dated Jul. 10, 2018, U.S. Appl. No. 15/063,383, filed Mar. 7, 2016.
FAIPP Pre-Interview Communicated dated Jun. 26, 2018, U.S. Appl. No. 15/584,001, filed May 1, 2017.

(56) References Cited

OTHER PUBLICATIONS

EP Summons to Attend Oral Hearing dated Feb. 2, 2019, European Application Seriall No. 13871478.7 filed on Jan. 18, 2013.
Japanese Decision for Granted dated Feb. 5, 2019, Japanese Application Serial No. 2015-556972; filed on Jun. 25, 2015.
FAIPP Pre-Interview Communication dated Mar. 8, 2019, U.S. Appl. No. 15/633,737, filed Jun. 26, 2017.
JP Office Action dated Mar. 31, 2019, JP Application No. 2017-526939, filed on May 18, 2017.
Notice of Allowance dated Jan. 24, 2019, U.S. Appl. No. 15/584,001, filed May 1, 2017.
Indurkar, Dhananjay, "Mobile Phone Differentiated Set-Up," filed Mar. 29, 2019, U.S. Appl. No. 16/370,880.
EP Exam Report dated Jun. 13, 2019, EP International Application No. 11847301.6, filed on Jun. 20, 2013.
EP Examiner's Communication dated Jun. 19, 2019, European Application Serial. No. 13871478.7 filed on Jan. 18, 2013.
Decision on Appeal dated Jun. 24, 2019, U.S. Appl. No. 14/060,719, filed Oct. 23, 2013.
Notice of Allowance dated Jul. 12, 2019, U.S. Appl. No. 14/060,719, filed Oct. 23, 2013.

* cited by examiner

SELF-IDENTIFICATION OF BRAND AND BRANDED FIRMWARE INSTALLATION IN A GENERIC ELECTRONIC DEVICE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile virtual network operators (MVNO) are organizations that provide mobile phone services but may not have their own licensed frequency allocation of radio spectrum or the physical infrastructure required to provide wireless telephone services. Mobile virtual network operators may contract to distribute wireless services provided by telecommunications service providers that have licensed frequency and physical infrastructure. Mobile virtual network operators function as distributors of wireless services and may set their own pricing structures. The proliferation of mobile virtual network operators has been facilitated by regulatory intervention designed to lower the barriers for market entry and ultimately increase competition. Some telecommunications service providers have made strategic decisions to extend their existing operations by distributing their services to target niche or under-served market segments through a second or perhaps multiple brands. Some telecommunications service providers believe that there is merit in operating a wholesale mobile virtual network operator business unit to complement their retail model. These providers have therefore either embraced mobile virtual network operator partners or launched their own branded mobile virtual network operator.

Branding is a general marketing term that applies to many products and may be considered to be the process of distinguishing a product or products of a given brand from those of other brands. Branding may be accomplished using names, terms, graphic images, design methods, aural cues, or any other feature that distinguishes. In the context of electronic devices, for example mobile phones, branding information may comprise a distinctive splash screen that displays when an application is loading, a background theme that displays behind application icons, a distinctive wall paper, a distinctive aural alert that may be sounded when events associated with fundamental functions of the device occur, and/or other distinctive cues. Branding information may comprise customized controls and/or switches. Branding information may comprise a short code that references a voice mail service. Branding information may comprise preferred universal reference locators (URLs) that may be provided as pre-loaded favorites in a web browser. Branding information may comprise a link to a preferred on-line application store. Branding information may also include other media and settings.

SUMMARY

In an embodiment, a mobile phone that is delivered by an original equipment manufacturer in an unbranded state is disclosed. The mobile phone comprises a near-field-communication radio transceiver, a memory, a processor, and an application stored in the memory. When executed by the processor, the application reads brand information, using the near-field-communication radio transceiver, from a radio frequency identity (RFID) tag coupled to the mobile phone during an order fulfillment process in a distribution center of a communication service provider and, based on the brand information, loads brand firmware into the memory, whereby the mobile phone presents a branded look and feel.

In an embodiment, a method of providing branding firmware to a portable electronic device after manufacturing of the portable electronic device is disclosed. The method comprises receiving the portable electronic device in a distribution center, wherein the distribution center is a different location from the location where the portable electronic device is manufactured and providing a component having branding information to the portable electronic device in the distribution center. The method further comprises scanning the component to determine a brand identification, wherein the scanning is performed by an electronic scanner in the distribution center, selecting branding firmware based on the brand identification, wherein the selecting is performed by a computer, and wirelessly transmitting the branding firmware to the portable electronic device in the distribution center.

In an embodiment, a mobile electronic device branded firmware provisioning system is disclosed. The system comprises a data store comprising a plurality of different branded firmware, each branded firmware associated with a different communication service provider brand, a wireless communication network, and a server computer. The server computer receives a request from a mobile electronic device for one of the branded firmware, retrieves a copy of the requested branded firmware from the data store, and transmits the copy of the requested branded firmware to the mobile electronic device wirelessly via the wireless communication network.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
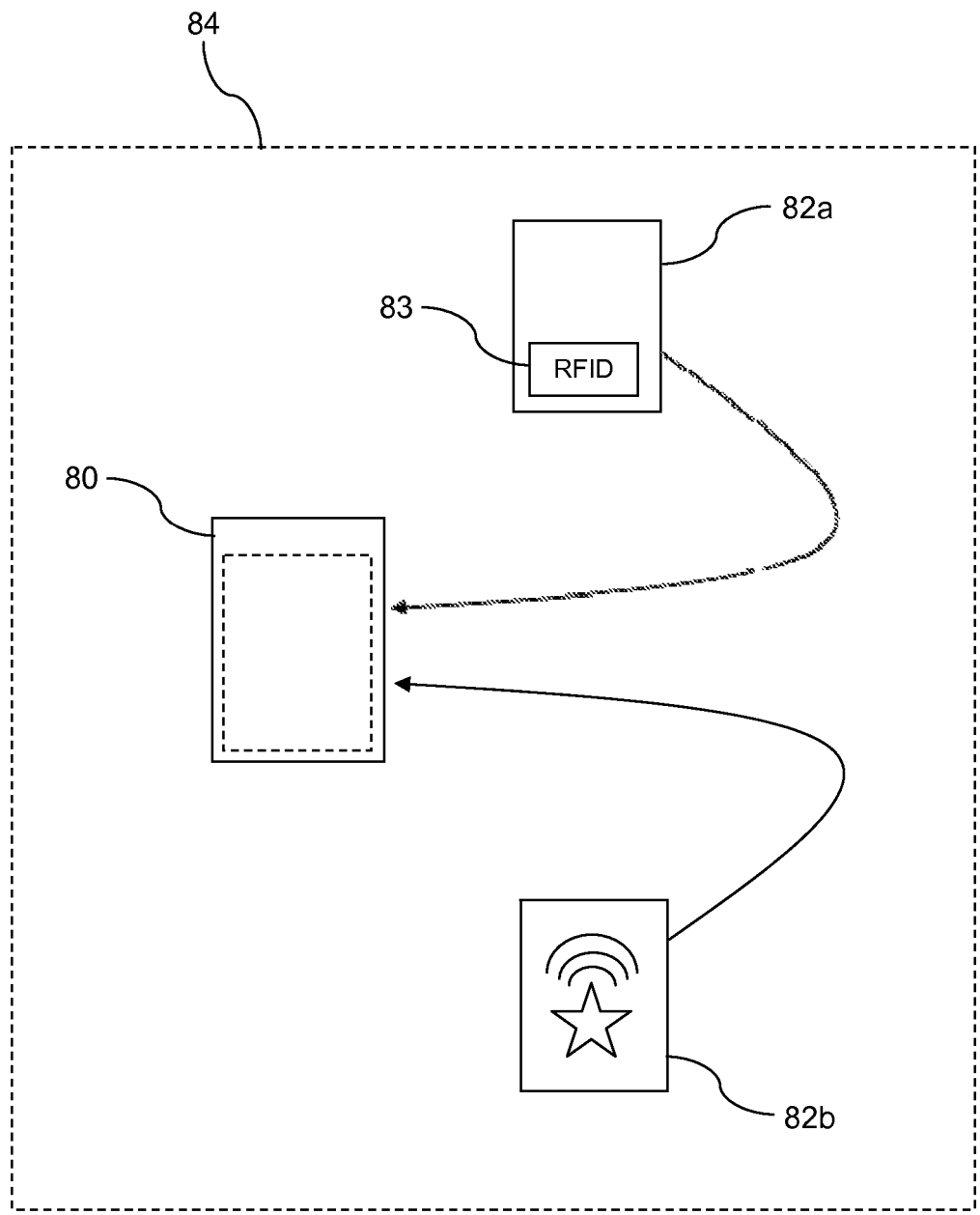
FIG. 1 is an illustration of an electronic device and a battery cover.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Electronic devices may be delivered by an original equipment manufacturer (OEM) in an initially unbranded state and then provisioned by a purchaser, for example a wireless communication service provider, to execute different branded firmware after the manufacturing process has been completed. Provisioning different branded firmware to initially unbranded electronic devices may enable large volume purchases of a base model of electronic device, thereby obtaining the large volume price discounts customarily provided by original equipment manufacturers. The present disclosure teaches a variety of systems and methods for automatically provisioning branding to electronic devices. Such automated branding may reduce both the amount of labor hours expended in branding as well as reduce the skill level needed to perform branding, both of which may reduce labor costs associated with branding.

For example, a base model of mobile phone may be delivered by an original equipment manufacturer to a wireless carrier. The wireless carrier may modify some of the base models by installing a first battery cover associated with a first brand and installing a second battery cover associated with a second brand. After installing the branded battery covers, the wireless carrier may wirelessly transmit a first branded firmware to the mobile phones having the first battery cover and may wirelessly transmit a second branded firmware to the mobile phones having the second battery cover, thereby causing the originally unbranded mobile phones to present differentiated branding. The present disclosure contemplates a number of different approaches to performing this post-manufacturing branding. Alternatively, other branded components that are coupled to the mobile phone during an order fulfillment process may be used to provision different branded firmware to the mobile phone, for example a component inserted into a port of the mobile phone, a component that is clipped or snapped into place on a surface of the mobile phone, or some other component installed during order fulfillment. It may be understood that branded battery covers are a specific instance of or a specific member among a plurality of members of the set of branded components.

In an embodiment, the branded battery cover or other branded component may comprise a radio frequency identity (RFID) tag coupled to and/or adhered to the branded battery cover. When a battery is installed in an initially unbranded electronic device, the branded battery cover is installed onto the initially unbranded electronic device, and the initially unbranded electronic device is powered on, a self-branding application stored in a memory of the initially unbranded electronic device executes. Alternatively, some other component that is installed into the mobile phone or clipped to or snapped into place on a surface of the mobile phone may comprise a radio frequency identity tag coupled to the component. When the component is installed into, clipped to, or snapped into an initially unbranded electronic device, when the electronic device powers on, the self-branding application stored in the memory of the initially unbranded electronic device executes.

The self-branding application reads branding information from the RFID tag coupled to and/or adhered to the branded battery cover. The branding information read from the RFID tag may be limited to an identification of a brand, for example Brand A Wireless Carrier, and the self-branding application may subsequently use this brand identity to access and to download branding firmware from a wireless local area network. The self-branding application may then install the downloaded branding firmware in a memory of the electronic device. Alternatively, the branding firmware associated with a plurality of different brands may be stored in the memory of the electronic device in an inactive or dormant state. When the brand identity is determined by reading the RFID tag, the self-branding application may then use the brand identity to select the appropriate branding firmware from among the plurality of stored branding firmware and make the selected branding firmware active.

Alternatively, the branding information read from the RFID tag may include an identification of a brand as well as some branding graphics. The self-branding application may install the branding graphics firmware in the memory of the electronic device and then use the brand identity to access and to download additional branding firmware from the wireless local area network. Alternatively, the branding information read from the RFID tag may include an identification of a brand as well as references and/or links to branding firmware. The self-branding application may then use the references and/or links to access and to download branding firmware. The self-branding application may then install the downloaded branding firmware in the memory of the electronic device. Alternatively, the branding information read from the RFID tag may include all branding firmware, and the self-branding application may read the branding information from the RFID tag and install the branding firmware in the memory of the electronic device.

The memory of the electronic device may include a branding register or other memory location that indicates whether the electronic device has installed a complete set of branding firmware or not. When the electronic device powers on and boots, the self-branding application may execute and check the state of the branding register. If the branding register indicates the electronic device has already installed branding firmware, the self-branding application may terminate. On the other hand, if the branding register indicates the electronic device has not installed branding firmware, the self-branding application may execute as described briefly above. If an electronic device is to be rebranded, this may be accomplished by resetting the branding register and installing a branded battery cover having an RFID tag with different branding information. When the electronic device powers on and boots after the register reset, the self-branding application runs and rebrands the electronic device.

The self-branding application may incorporate instructions for completing downloading and/or installing branding firmware in the event that a preferred branding firmware installation procedure does not succeed for some reason. For example, in an embodiment, the above described branding procedure may preferably completed in a distribution center prior to shipping of the electronic device to a retail store and/or to an end-user. Due to unexpected conditions, however, the desired downloading and installation of branding firmware may not have been completed in the distribution center. The self-branding application may detect this and attempt to complete branding firmware access, download, and installation using alternative procedures. For example, the self-branding application may alternatively access and download branding firmware via a cellular wireless network.

In an embodiment, the branded battery cover or other component features a brand graphic such as a logo or other distinctive graphic, and an electronic scanner in a distribution center reads and identifies the brand based on the scan of the brand graphic. Alternatively, the electronic scanner may read the RFID tag coupled to the battery cover or other component and identify the brand based on the scan of the RFID tag, for example in the case of an electronic device that lacks a near-field-communication radio transceiver and hence is unable to read the RFID tag itself. The electronic scanner may transmit the brand identity to the electronic device, and the self-branding application in the electronic device may use this brand identity to access, download, and install branding firmware along lines suggested above. It will be appreciated that a variety of other self-branding procedures and operations are also contemplated by the present application.

In an embodiment, a mobile phone or other portable communication device may be shipped from an original equipment manufacturer with unbranded firmware stored in non-volatile memory, for example in EPROM memory. Later, for example in an order fulfillment center, a branding process may install branding information and/or branding firmware into a different portion of memory of the mobile phone or portable communication device, for example in a flash memory area. The unbranded firmware contains instructions to load the branding information and/or branding firmware from the flash memory. This process may result in an originally generic and/or unbranded mobile phone or portable communication device being branded and/or associated with a specific brand. If the flash memory is erased and/or reset, the phone is substantially returned to its initial unbranded, generic state and upon reboot, this device will again go through the branding process.

Turning now to FIG. 1, an electronic device 80 is described. As illustrated in FIG. 1, the electronic device 80 may be provided with a first branded battery cover 82a that features an RFID tag 83 or, alternatively, with a second branded battery cover 82b that does not have an RFID tag but instead features a branded graphic (illustrated in FIG. 1 by a star surmounted by radiated waves). It is understood that the first branded battery cover 82a may also feature a branded graphic. Any number of different brands may be identified by battery covers featuring RFID tags. For example, a Brand X may be associated with a branded battery cover 82a having an RFID tag identifying Brand X, while a Brand Y may be associated with a branded battery cover 82a having an RFID tag identifying Brand Y. Likewise, any number of different brands may be identified by battery covers featuring a branded graphic. For example, a Brand W may be associated with a Brand W branded graphic on the branded battery cover 82b, while a Brand Z may be associated with a Brand Z branded graphic on the branded battery cover 82b. While the description below refers to branded battery covers, it is understood that the present disclosure contemplates using other components that may be plugged into, attached to, snapped into the electronic device 80 and which provides branding information such as an RFID tag and/or a graphical indicia that may be scanned.

The electronic device 80 may be provided as an initially unbranded device that is suitable for provisioning as any of a plurality of different branded electronic devices by installing appropriate branded firmware into a memory of the electronic device 80 and/or by selecting one of a plurality of pre-installed branded firmware and activating the selected branded firmware. In an embodiment, the electronic device 80 may be provided in an initially unbranded state to a distribution center 84 of a wireless carrier, and the branding process may begin by installing a battery into and attaching a branded battery cover 82 to the electronic device 80. The electronic device 80 may be a mobile phone, a personal digital assistant (PDA), a media player, a gaming device, or other electronic device.

Figure 2:
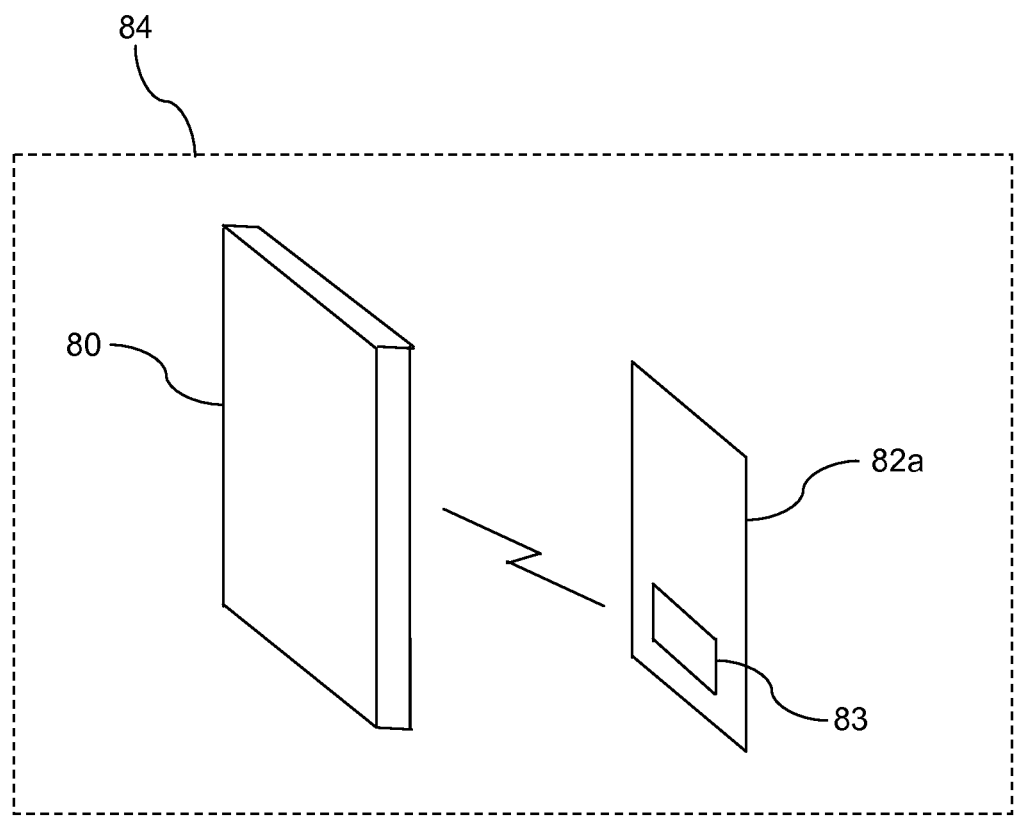
FIG. 2 is an illustration of an electronic device interacting with a battery cover according to an embodiment of the disclosure.

Turning now to FIG. 2, an interaction between the electronic device 80 and the first branded battery cover 82a is described. While in FIG. 2, the interaction between the first battery cover 82a and the electronic device 80 is depicted taking place in the distribution center 84, it is understood that the interaction may take place outside the distribution center 84. In an embodiment, when a battery is installed in the electronic device 80, a first branded battery cover 82a featuring the RFID tag 83 is attached to the electronic device 80, and the electronic device 80 is powered on, a self-branding application installed in a memory of the electronic device 80 executes and reads branding information from the RFID tag 83. The self-branding application may read the RFID tag 83 using a near-field-communication (NFC) radio transceiver or other radio transceiver of the electronic device 80.

It is contemplated that the self-branding application may read a variety of different branding information in different embodiments. In an embodiment, the RFID tag 83 may only identify the brand. In this case the self-branding application would then access and download branding firmware and/or branding content from some other source by providing the brand identity. Alternatively, a plurality of different branding firmware packages may be pre-loaded in a memory of the electronic device 80 in an inactive and/or dormant state, and the self-branding application may select one of the branding firmware packages using the brand identification read from the RFID tag 83 and make the selected branding firmware package active.

Alternatively, the RFID tag 83 may identify the brand and additionally store some but not all branding firmware and/or branding content. For example, the RFID tag 83 may further comprise branding graphics firmware and/or content such as branded application splash screens, branded backgrounds, and other branded graphics firmware and/or content. The RFID tag 83 may provide references and/or links to branding firmware and/or branding content, for example uniform resource locators (URLs) for completing a hypertext transport protocol (HTTP) access and/or an internet protocol address and a filename for completing a file transfer protocol (FTP) access. The self-branding application would then access and download additional branding firmware and/or branding content from some other source by providing the brand identity and/or by following references and/or links provided by the RFID tag 83. Alternatively, the RFID tag 83 may identify the brand and store all needed branding firmware and/or branding content. The self-branding application in this case would download all the needed branding firmware and/or branding content directly from the RFID tag 83.

After downloading branding firmware and/or branding content, the self-branding application may store the firmware and/or content in a memory of the electronic device 80. When the self-branding application has completed branding the electronic device 80, the self-branding application may set a branding flag or branding status in the memory of the electronic device 80. The self-branding application may be designed to execute and complete branding if the branding flag and/or branding status indicates the electronic device 80 is unbranded and to terminate and/or to not execute if the branding flag and/or branding status indicates the electronic device 80 is already branded. This behavior may be used to promote convenient rebranding of the electronic device 80. For example, the electronic device 80 could be rebranded by first setting the branding flag and/or branding status to the unbranded value, second replacing the branded battery cover 82a with a different branded battery cover 82a having an RFID tag 83 containing different branding information, and then powering on the electronic device 80, at which point the electronic device 80 would execute the self-branding application as described above and rebrand based on the different branding information contained in the RFID tag 83.

It is understood that branding firmware and/or branding content may comprise a wide variety of items. This may include various branded graphics including but not limited to application splash screens, backgrounds, themes, wallpapers, icons, and images. This may include branded application executable instructions. This may include customized controls and switches. This may include interfaces such as a link to a branded on-line store. This may include an interface to a branded voicemail application such as a pre-loaded short code. This may include preferred universal reference locators that may be provided as pre-loaded favorites in a web browser or elsewhere on a presentation screen of the electronic device 80. This may include other media and settings. This may include a branded interface and applications pack as discussed further below. In the interest of being concise, hereinafter brand identity, branding firmware, and/or branding content will be referred to collectively as branding information.

An interface and applications pack (IAP) comprises at least one of a media file, an application, a web widget, and a network service and may be used to customize the communication experience of using an electronic device. In an embodiment, the interface and applications pack comprises at least two of these enumerated elements. In another embodiment, the interface and applications pack comprises at least three of these enumerated elements. An interface and applications pack may be viewed as an aggregated set of applications, web widgets, network services, ring tones, ringback tones, alerting tones, wallpapers, interface controls, and other content targeted for the electronic device. In some contexts, the interface and applications pack may be referred to as an ID pack.

As an example, but not by way of limitation, an interface and applications pack may be produced by an enterprise such as a retail outlet or a media business to promote its business interests to wireless communication service subscribers. The interface and applications pack, when active on a electronic device, may provide a control to select a store mapping web widget that provides a map of the location of products within a retail store, where the map of the store is dynamically downloaded by the web widget based on a physical location of the electronic device and based on known locations of the retail stores operated by the enterprise. The map web widget may provide a control to select a search utility for finding the location of a specific product within a store.

The interface and applications pack may provide an application that automatically generates an electronic coupon and posts a notification about the coupon in a notifications display area of the electronic device. The application may generate the coupon and post the related notification based on determining that the physical location of the electronic device is in the proximity of a known retail store operated by the enterprise. Alternatively, the application may generate the coupon based on the passage of a period of time without the subscriber of the electronic device making a purchase from the enterprise and based on the day of the week, for example a Saturday when the subscriber of the electronic device has most often made purchases from the enterprise in the past. In an embodiment, the application may determine when the electronic device is in a retail store operated by the enterprise, establish a communication link with a corresponding application executing on a server in the retail store, and receive information about purchases made by the subscriber of the electronic device. This purchase information may be used in the process of generating coupons described above.

The interface and applications pack may provide controls to access a network application that promotes participation in relevant social media, for example to participate in a home improvement discussion forum sponsored by the subject retail store, to post photographs of home improvement projects the user has completed, and to post descriptions of the materials used and/or innovations applied to overcome peculiar problems. The interface and applications pack may provide controls to select videos posted to the home improvement social media site, for example video showing fundamental techniques of using tools.

The interface and applications pack may provide media files that define wall papers and themes that change the look and sounds of the electronic device. For example, the interface and application pack may include an audio file that defines an aural alert associated with receiving a short message service (SMS) message that is the sound of hammering. For example, the interface and application pack may include a picture file that defines the background of the display of the electronic device to be a photographic view of picturesque mountains seen through a 2×4 frame structure for a storage shed. These examples are provided to suggest the scope and power of the ID pack construct, but it is understood that a great variety of implementations of the ID pack are contemplated by the present disclosure. The interface and applications pack may include alerting tones that are played when selected events occur to alert a user, for example to alert the user that a simple message service (SMS) message has been received or to alert the user to an event or the approach of an event germane to the subject interface and applications pack.

The interface and applications pack may provide interface controls for selecting functionality provided as part of the interface and applications pack as well as for selecting functionality that may be provided by the electronic device independently of the interface and applications pack. For example, the interface and applications pack may provide a control for invoking an address book widget that is provided by the firmware of the electronic device or for invoking a voice call dialing functionality. Interface controls provided by the interface and applications pack that invoke functions provided by the electronic device itself, for example provided in firmware of the electronic device, may be referred to as encapsulated controls. Such encapsulation of controls by the interface and applications pack may promote a more complete adaptation of the communication experience.

The interface and applications pack further comprises an automatic self-installation routine that provides a user-friendly means to "stand up" the interface and applications pack for the electronic device. The self-installation routine may download applications, web widgets, ring tones, wallpapers, and other content to the electronic device. The self-installation routine may include instructions to automatically configure the device's home screens such as shortcuts, bookmarks, and widget placement. In an embodiment, a portion of the self-installation routine may execute partly in the network to provision and/or initialize network services, ringback tones, and other network-provided functionality associated with the interface and applications pack. For example, a portion of the self-installation routine may initialize and/or provision voice-mail changes. The portion of the self-installation routine that executes on the electronic device may invoke the portion of the self-installation routine that executes in the network. In an embodiment, a portion of the self-installation routine may be provided by a utility built into the basic firmware or software library of the electronic device and another portion of the self-installation routine may be provided as part of the specific interface and applications pack.

The interface and applications pack is experienced, at one level of abstraction, as a unity. For example, when a user selects an ID pack for installation on the electronic device, the user may perform a single selection action, and the self-installation routine may perform a number of separate and distinct actions to stand-up the selected ID pack that are not observed by the user. When the user selects an ID pack to be active, a currently active ID pack may be deactivated and the various distinct components of the selected ID pack may be brought into operation as a single global action, mediated by the automatic self-installation routine. The unity of experience may be further promoted by interactions among the several components of the ID pack. For example, selection of controls in a web widget of the ID pack may invoke playback of audios stored in media files of the ID pack; for example, execution of an application of the ID pack may trigger a modification of the wallpaper presented as a backdrop for the display of the electronic device.

An interface and applications pack may be tested to assure that the aggregation of media files, applications, web widgets, and network services interact appropriately with each other and do not impair other functionality of the electronic device. The testing may verify that the interface and applications pack interoperates with a range of different electronic devices, standard firmware, and/or standard applications. In an embodiment, the service provider may impose a constraint that interface and applications packs be provided to the electronic device from a controlled content source so that the service provider can exercise oversight and quality control of interface and applications packs. For further details about interface and applications packs, see patent application.

Figure 3:
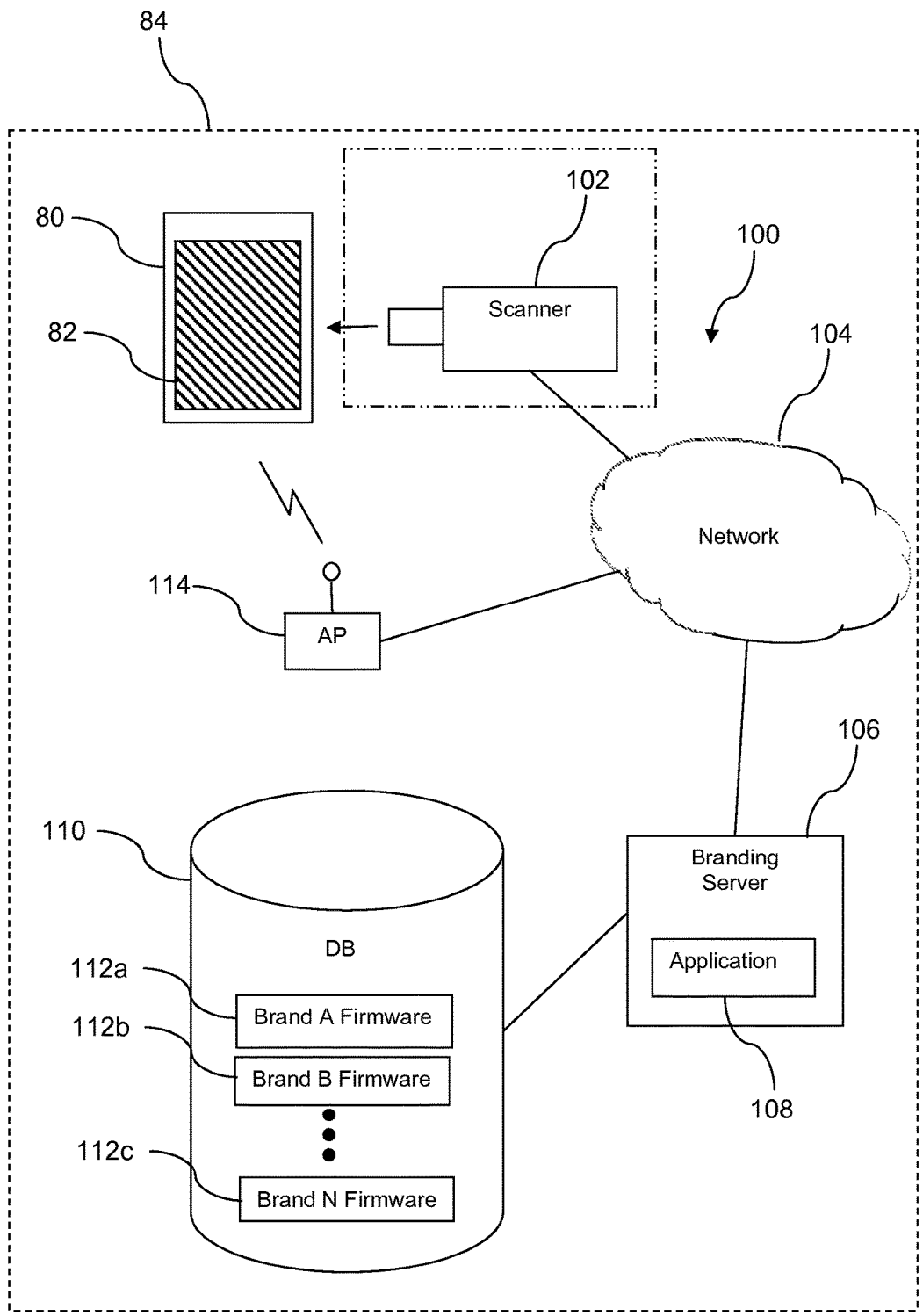
FIG. 3 is an illustration of an aspect of a branding firmware installation system according to an embodiment of the disclosure.

Turning now to FIG. 3, a first branding system 100 is described. In an embodiment, the first branding system 100 comprises a network 104, a branding server 106, a branding support application 108, a data store 110, and a wireless access point 114. The data store 110 may store a plurality of branding firmware packages 112 for example a brand A firmware package 112a, a brand B firmware package 112b, and a brand N firmware package 112c. It is understood that the data store 110 may store any number of branding firmware packages 112. The network 104 may be any combination of private and public networks. While the network 104 is shown inside the abstract boundaries of the distribution center 84, it is understood that the network 104 may extend outwards of the distribution center 84 and may comprise the Internet. The branding server 106 may be implemented as a computer system. Computer systems are described further hereinafter.

The electronic device 80 may establish a wireless link with the wireless access point 114 and communicate via the wireless access point 114 and via the network 104 to request the branding support application 108 to download one of the branding firmware packages 112 based on a brand identity provided in the request. The branding support application 108 may access the data store 110, retrieve a copy of the selected branding firmware package 112, and transmit the copy of the selected branding firmware package 112 to the electronic device 80. The electronic device 80 may also access and retrieve some branding information using a file transfer protocol (FTP) request from a source accessible from the network 104. The electronic device 80 may also access and retrieve some branding information using a hypertext transport protocol (HTTP) request comprising links to branding information via the network 104. In an embodiment, the electronic device 80 may determine a brand identity from the RFID 83 and initiate the wireless link with the wireless access point 114 as part of a branding procedure promoted by execution of a self-branding application on the electronic device 80.

In an embodiment, the system 100 may further comprise an optional electronic scanner 102. The electronic scanner 102 may read the branding identity from the RFID tag 83, for example in the circumstance where the electronic device 80 lacks a radio suitable for reading the RFID tag 83 itself, communicates this information to the branding support application 108, and the branding support application 108 transmits this information to the electronic device 80 via the wireless access point 114. The branding support application 108 may further select one of the branding firmware packages 112 based on the brand identity and transmit a copy of the selected branding firmware package 112 to the electronic device via the wireless access point 114. The optional electronic scanner 102 alternatively may read optical information from the electronic device, for example the optional electronic scanner 102 may capture an image of a branded graphic from the second branded battery cover 82b. The optional electronic scanner 102 may transmit the scanned image of the branded graphic to the branding support application 108. The branding support application 108 may execute an image processing routine to match the scanned image or a portion of the scanned image to a dictionary of valid brand identities. The branding support application 108 may then select one of the branding firmware packages 112 based on the brand identity and transmit a copy of the selected branding firmware package 112 to the electronic device 80 via the wireless access point 114. When the electronic device 80 has received the branding firmware package 112, the electronic device 80 may load and/or activate the branding firmware. The electronic device 80 may also use links and/or references provided by the branding support application 108 to access and retrieve branding information via the wireless access point 114 and the network 104.

Figure 4:
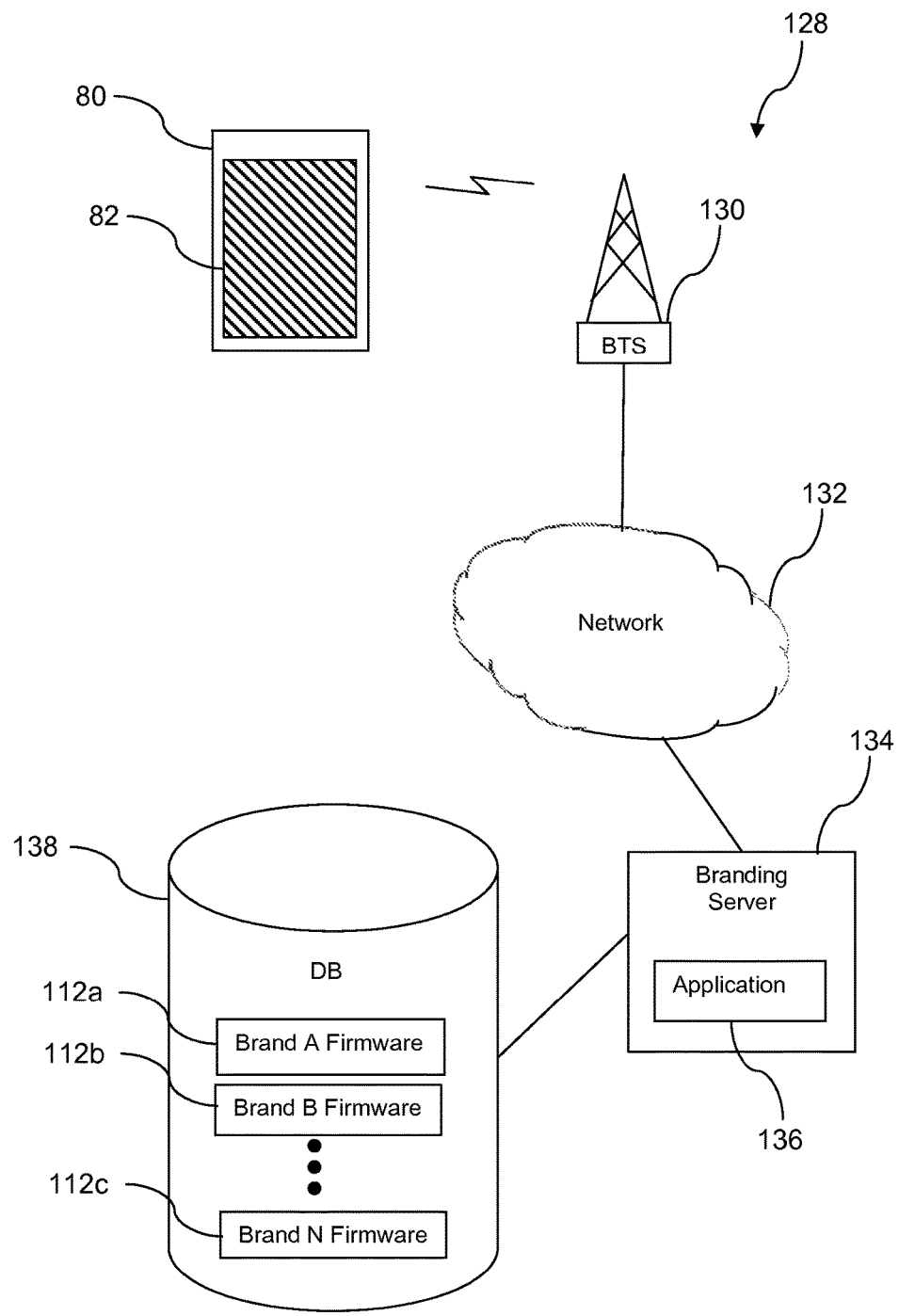
FIG. 4 is an illustration of another aspect of a branding firmware installation system according to an embodiment of the disclosure.

Turning now to FIG. 4, a second branding system 128 is described. In an embodiment, the second branding system 128 comprises a base transceiver station 130, a network 132, a server computer 134 executing a branding support application 136, and a data store 138. In an embodiment, some components of the second branding system 128 may be shared with the first branding system 128. Whether these components are shared between the branding systems 100, 128 or separated is an implementation detail that one skilled in the art, in combination with the present disclosure, can readily determine. The data store 138 stores the branding firmware packages 112 that are likewise stored in the data store 110 described above with reference to FIG. 3.

Under some circumstances, the electronic device 80 may miss branding when in the distribution center 84 and may be shipped to its destination in its initially unbranded state. For example, due to a defect in the training process a new employee may pack the battery and branded battery cover 82 in the retail sale package of the electronic device 80 but fail to power on the electronic device 80. Under this circumstance, the electronic device 80 may not be branded.

In an embodiment, the self-branding application executing on the electronic device 80 may be programmed to attempt to establish communication links to complete branding according to a hierarchy of preferences. The self-branding application executing on the electronic device 80 may first attempt to connect to the wireless access point 114 described above with reference to FIG. 3. Failing in the attempt to connect to the wireless access point 114, the self-branding application executing on the electronic device 80 may attempt to read a branding firmware package 112 from a memory card inserted in a slot of the electronic device 80. Failing to find a memory card inserted in the slot of the electronic device 80, the self-branding application executing on the electronic device 80 may attempt to connect to a cellular wireless network via the base transceiver station 130. The self-branding application, having established a communication link to the network 132 via the base transceiver station 130, may interwork with the branding server 134 to access, download, and install a branding firmware package 112 much as described above with reference to FIG. 3. In an embodiment, the sequence of sources that the self-branding application follows in seeking to access, download, and install a branding firmware package 112 may be defined by branding information provided by the RFID tag 83.

Figure 5:
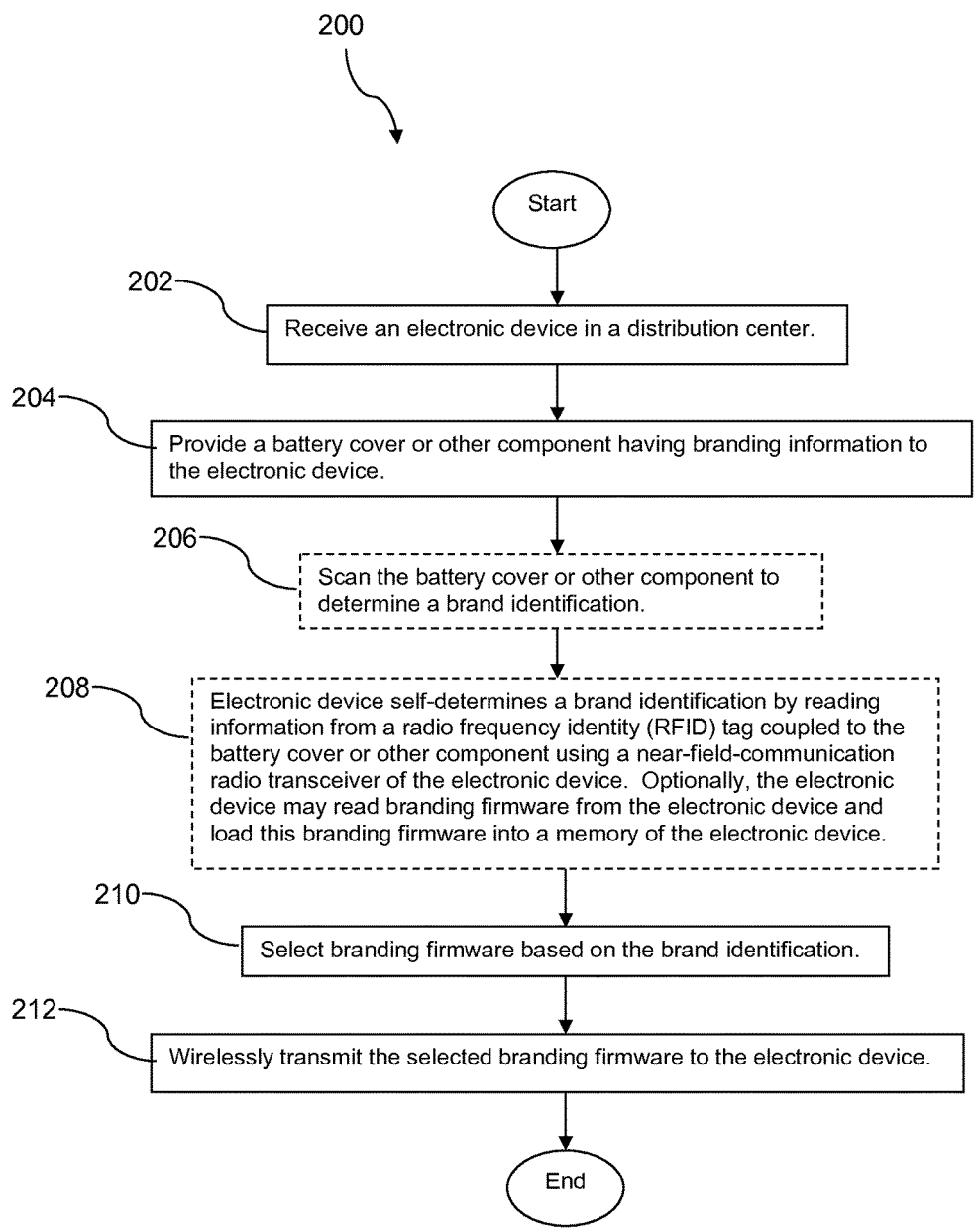
FIG. 5 is a flow chart illustrating some aspects of a method of installing branding firmware according to an embodiment of the disclosure.

Turning now to FIG. 5, a method 200 is described. At block 202, an electronic device is received into a distribution center. This may be the electronic device 80 described above. The electronic device may be shipped by an original equipment manufacturer in an unbranded state. The electronic device may have no brand specific content and/or firmware. Alternatively, the electronic device may have some but not all desired brand content and/or firmware. The electronic device may store brand specific content and/or firmware associated with a plurality of different brands, but none of this brand content and/or firmware may be active but instead may be in a dormant state. The distribution center may be operated by a large wireless communication service provider that supports its own flagship brand, one or more specialized brands, and one or more brands of independent business enterprises such as a mobile virtual network operator (MVNO). The electronic device may be a large range of different devices, for example a mobile phone, a personal digital assistant (PDA), a media player, a gaming device, and other electronic devices.

At block 204 a battery cover comprising branding information is provided to the electronic device. In block 204, a battery may be installed into the electronic device and the battery cover may be attached to the electronic device. In some contexts the battery cover may be referred to as a branded battery cover. The branding information may comprise any of the branding information described above. The branding information may merely be a branded graphic that may be scanned to determine a brand identity. Alternatively, the branding information may be a radio frequency identity (RFID) tag that contains the brand identity and optionally further branding information. It is understood that in some embodiments another component may be plugged into, attached to, or snapped into the electronic device that comprises branding information. In general, a battery cover may be understood to be a member of this larger set of components.

At block 206, the battery cover or other component is optionally scanned to determine the brand identity. This may comprise taking a digital image of a branded graphic on the battery cover or other component and analyzing the digital image to determine the brand identity based on the branded graphic. Alternatively, this may comprise reading information from a radio frequency identity tag coupled to the battery cover or the electronic device itself to determine the brand identity.

At block 208, the electronic device optionally self-determines a brand identity by reading information from a radio frequency identity tag coupled to the battery cover, to another component, or to the electronic device itself using a near-field-communication radio transceiver of the electronic device. The electronic device may further read additional branding information from the radio frequency identity tag and load this branding firmware and/or branding content into a memory of the electronic device.

At block 210, branding firmware is selected based on the brand identification determined in block 206 and/or block 208 described above. At block 212, branding firmware and/or branding content is wirelessly transmitted to the electronic device. The branding firmware and/or branding content may comprise any of the different kinds of branding firmware and/or branding content described above.

Figure 6:
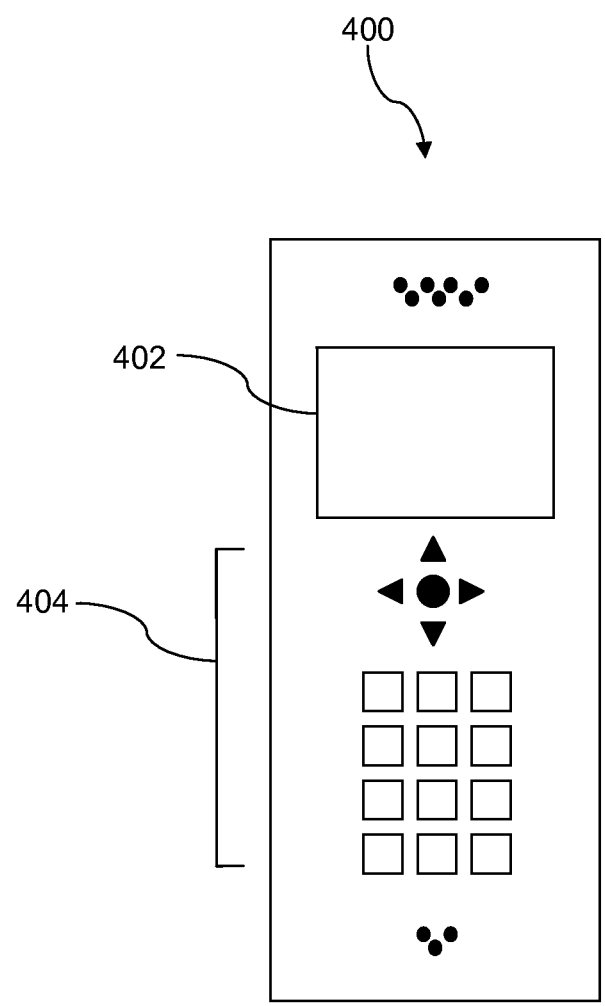
FIG. 6 is an illustration of an exemplary electronic device according to an embodiment of the disclosure.

FIG. 6 shows an electronic device 400. FIG. 6 depicts the electronic device 400, which is operable for implementing aspects of the present disclosure, but the present disclosure should not be limited to these implementations. Though illustrated as a mobile phone, the electronic device 400 may take various forms including a wireless handset, a pager, a personal digital assistant (PDA), a gaming device, or a media player. In an embodiment, the electronic device 400 may be used to implement the electronic device 80 described above. The electronic device 400 includes a display 402 and a touch-sensitive surface and/or keys 404 for input by a user. The electronic device 400 may present options for the user to select, controls for the user to actuate, and/or cursors or other indicators for the user to direct. The electronic device 400 may further accept data entry from the user, including numbers to dial or various parameter values for configuring the operation of the handset. The electronic device 400 may further execute one or more software or firmware applications in response to user commands. These applications may configure the electronic device 400 to perform various customized functions in response to user interaction. Additionally, the electronic device 400 may be programmed and/or configured over-the-air, for example from a wireless base station, a wireless access point, or a peer electronic device 400. The electronic device 400 may execute a web browser application which enables the display 402 to show a web page. The web page may be obtained via wireless communications with a base transceiver station, a wireless network access node, a peer electronic device 400 or any other wireless communication network or system.

Figure 7:
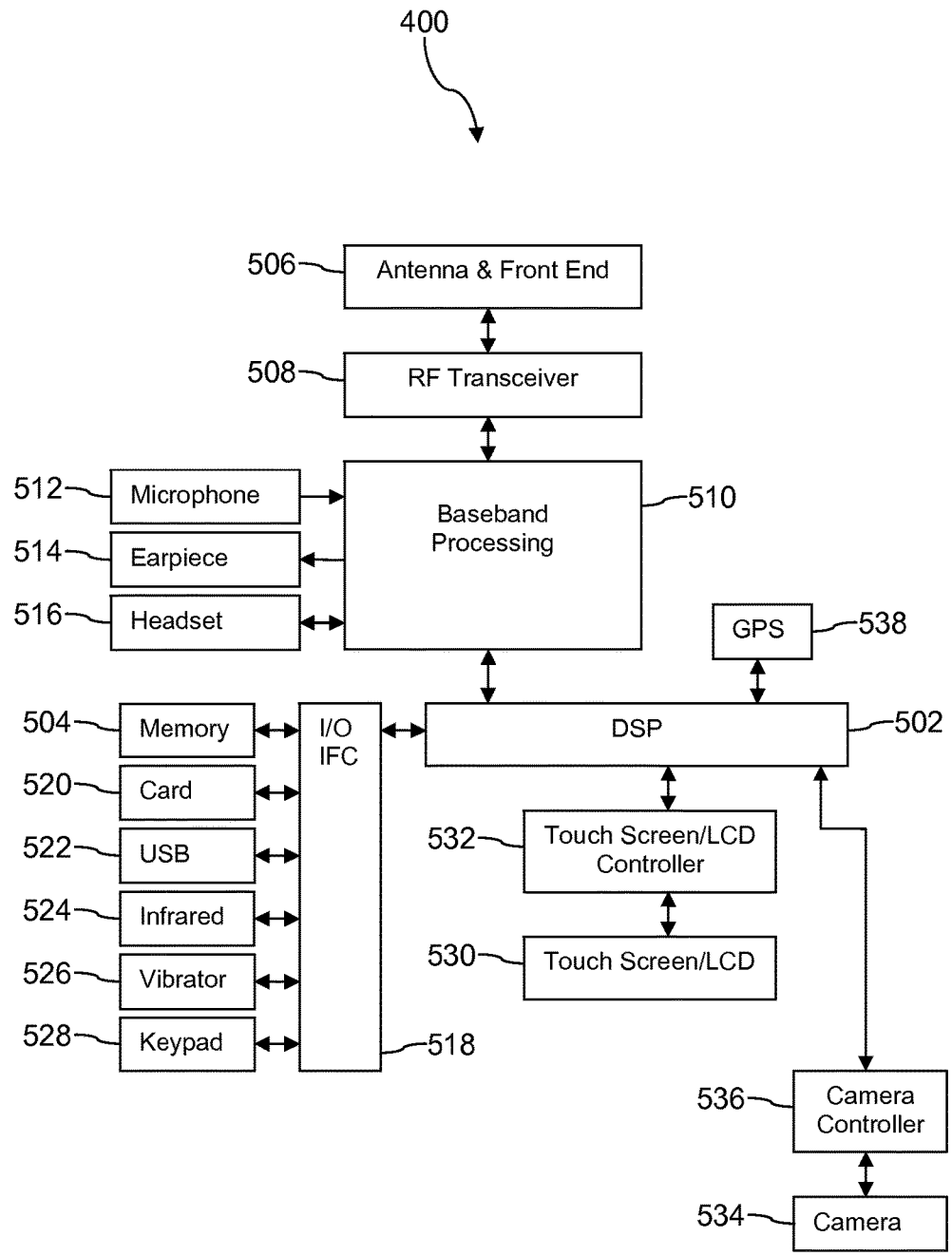
FIG. 7 is a block diagram of a hardware architecture of an electronic device according to an embodiment of the disclosure.

FIG. 7 shows a block diagram of the electronic device 400. While a variety of known components of handsets are depicted, in an embodiment a subset of the listed components and/or additional components not listed may be included in the electronic device 400. The electronic device 400 includes a digital signal processor (DSP) 502 and a memory 504. As shown, the electronic device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the electronic device 400 may include another kind of display that does not provide a touch sensitive screen. In an embodiment, the DSP 502 may communicate directly with the memory 504 without passing through the input/output interface 518. Additionally, in an embodiment, the electronic device 400 may comprise other peripheral devices that provide other functionality.

The DSP 502 or some other form of controller or central processing unit operates to control the various components of the electronic device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the electronic device 400 to function as a peripheral device to exchange information with a personal computer or other computer system. The infrared port 524 and other optional ports such as a Bluetooth interface or an IEEE 802.11 compliant wireless interface may enable the electronic device 400 to communicate wirelessly with other nearby handsets and/or wireless base stations.

The keypad 528 couples to the DSP 502 via the interface 518 to provide one mechanism for the user to make selections, enter information, and otherwise provide input to the electronic device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the electronic device 400 to determine its position.

Figure 8A:
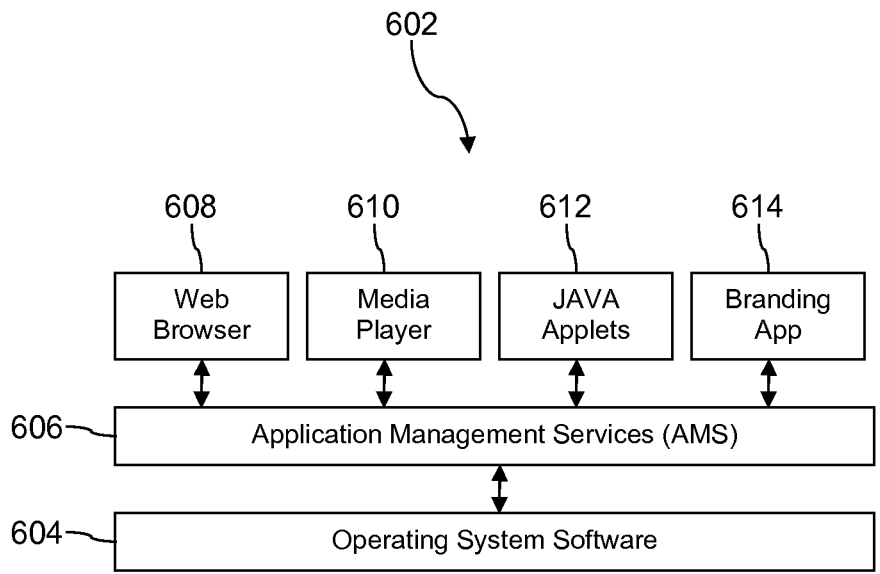
FIG. 8A is a block diagram of a software architecture of an electronic device according to an embodiment of the disclosure.

FIG. 8A illustrates a software environment 602 and/or software architecture that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the electronic device 400. Also shown in FIG. 6A are a web browser application 608, a media player application 610, JAVA applets 612, and a self-branding application 614. The web browser application 608 may be executed by the electronic device 400 to browse content and/or the Internet, for example when the electronic device 400 is coupled to a network via a wireless link. The web browser application 608 may permit a user to enter information into forms and select links to retrieve and view web pages. The media player application 610 may be executed by the electronic device 400 to play audio or audiovisual media. The JAVA applets 612 may be executed by the electronic device 400 to provide a variety of functionality including games, utilities, and other functionality. In an embodiment, the self-branding application 614 may promote branding firmware retrieval and/or installation as described further above.

Figure 8B:
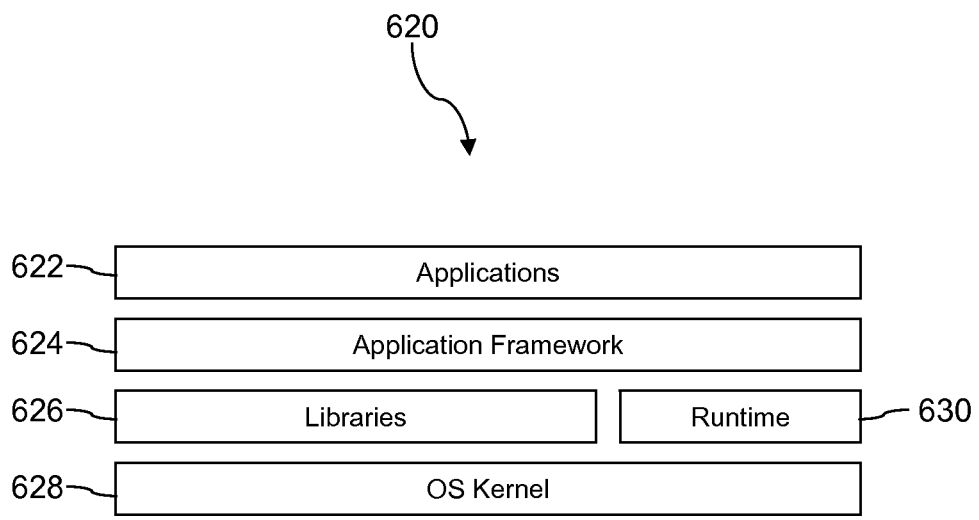
FIG. 8B is a block diagram of another software architecture of an electronic device according to an embodiment of the disclosure.

FIG. 8B illustrates an alternative software environment 620 and/or software architecture that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626. In an embodiment, at least one of the applications 622 may be a self-branding application that promotes branding firmware retrieval and/or installation as described further above.

Figure 9:
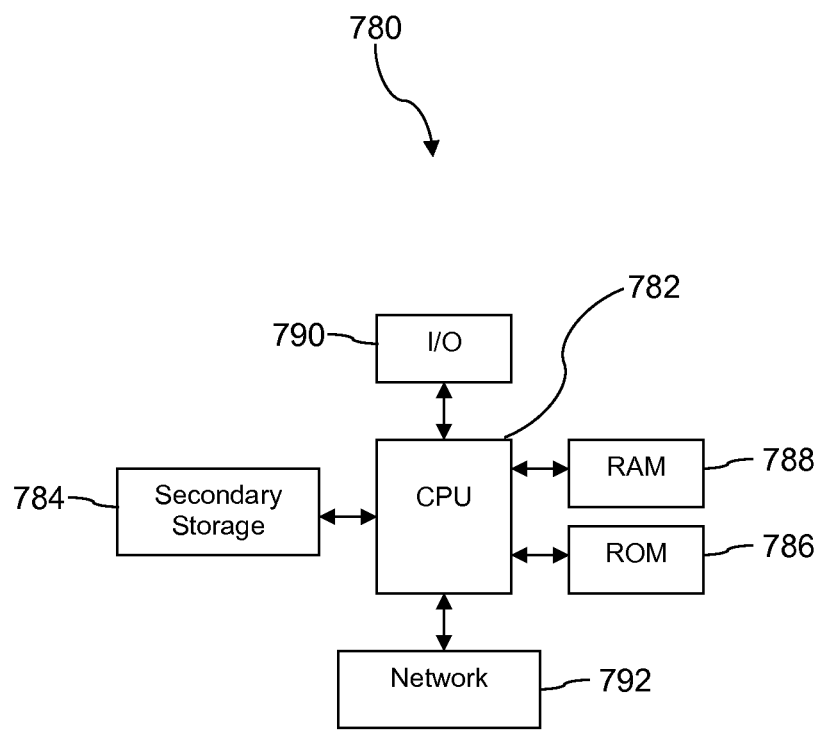
FIG. 9 is a block diagram of a computer system according to an embodiment of the disclosure.

FIG. 9 illustrates a computer system 780 suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784. The secondary storage 784, the RAM 788, and/or the ROM 786 may be referred to in some contexts as computer readable storage media and/or non-transitory computer readable media.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 792 may enable the processor 782 to communicate with the Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embedded in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 784, for example, hard drives, floppy disks, optical disks, and/or other device, the ROM 786, and/or the RAM 788 may be referred to in some contexts as non-transitory instructions and/or non-transitory information.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data structures in part by directly accessing the computer program product, for example by reading from a CD-ROM disk inserted into a disk drive peripheral of the computer system 780. Alternatively, the processor 782 may process the executable instructions and/or data structures by remotely accessing the computer program product, for example by downloading the executable instructions and/or data structures from a remote server through the network connectivity devices 792. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

In some contexts, the secondary storage 784, the ROM 786, and the RAM 788 may be referred to as a non-transitory computer readable medium or a computer readable storage media. A dynamic RAM embodiment of the RAM 788, likewise, may be referred to as a non-transitory computer readable medium in that while the dynamic RAM receives electrical power and is operated in accordance with its design, for example during a period of time during which the computer 780 is turned on and operational, the dynamic RAM stores information that is written to it. Similarly, the processor 782 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile phone that is delivered by an original equipment manufacturer in an unbranded state, comprising:
   a near-field-communication (NFC) radio transceiver;
   a non-transitory memory;
   at least one processor; and
   a self-branding application stored in the non-transitory memory that, when executed by the at least one processor while the mobile phone is at a distribution center and prior to the mobile phone being provided to a retail store or an end user,
      reads a state of a branding flag stored in the non-transitory memory,
      determines that the state of the branding flag is an unbranded state,
      in response to determining that the branding flag is in the unbranded state, reads an identification of a brand that is associated with a communication service provider, using the NFC radio transceiver, from a radio frequency identity (RFID) tag, the RFID tag with the identification of the brand being coupled to the mobile phone in the distribution center, where the communication service provider is different from the original equipment manufacturer,
      based on the identification of the brand, selects and loads brand firmware into the non-transitory memory,
      activates the brand firmware that configures the mobile phone to a branded state, and
      after activating the brand firmware, sets the state of the branding flag to a branded state.

2. The mobile phone of claim 1, wherein the self-branding application further reads branding graphics firmware from the RFID tag and loading brand firmware into the non-transitory memory comprises loading the branding graphics firmware read from the RFID tag into the non-transitory memory.

3. The mobile phone of claim 1, wherein the RFID tag is coupled to a branded battery cover that is attached to the mobile phone during an order fulfillment process at the distribution center.

4. The mobile phone of claim 1, wherein the self-branding application further reads links from the RFID tag and acquires at least some of the brand firmware that is loaded by accessing the links.

5. The mobile phone of claim 1, wherein the brand firmware comprises a preferred roaming list.

6. The mobile phone of claim 1, wherein the self-branding application uses the identification of the brand to access a wireless network in the distribution center, and downloads the brand firmware via the wireless network.

7. A method of providing branding firmware to a portable electronic device after manufacturing of the portable electronic device, comprising:
   receiving, in a distribution center, the portable electronic device that is in an unbranded state, wherein the distribution center is a different location from a location where the portable electronic device is manufactured;
   providing a component to the portable electronic device in the distribution center, wherein the component comprises a brand identification, where the brand is associated with a communication service provider and the communication service provider is different from an original equipment manufacturer that manufactured the portable electronic device;
   while the portable electronic device is at the distribution center and prior to the portable electronic device being provided to a retail store or an end user:
      scanning the component to determine the brand identification, wherein the scanning is performed by an electronic scanner in the distribution center;
      determining, via the component, the brand identification in response to the scanning;
      selecting, from a data store, branding firmware based on determining the brand identification from the component, wherein the selecting is performed by the computer communicatively coupled to the electronic scanner; and
      responsive to the selection, wirelessly transmitting the branding firmware from the data store to the portable electronic device in the distribution center, wherein in response to the portable electronic device receiving the wireless transmission, the branding firmware configures the portable electronic device from the unbranded state into a branded state associated with the communication service provider.

8. The method of claim 7, wherein the portable electronic device is a mobile phone, a personal digital assistant, a media player, or any combination thereof.

9. The method of claim 7, wherein the component has a branded graphic, and wherein the electronic scanner is an optical scanner that scans the branded graphic.

10. The method of claim 7, wherein the component has a radio frequency identity tag that stores the brand identification and scanning the component to determine the brand identification is performed by a near-field-communication reader.

11. The method of claim 7, further comprising:
detecting that the branding firmware is not stored in a non-transitory memory of the portable electronic device; and
wherein the wirelessly transmitting the branding firmware to the portable electronic device is subsequent to the detecting.

12. The method of claim 7, further comprising:
providing a different component comprising a different brand identification to the portable electronic device;
resetting a branded state flag in the portable electronic device;
receiving a request from the portable electronic device for different branding information based on the reset branded state flag in the portable electronic device; and
wirelessly transmitting different branding firmware to the portable electronic device, wherein the different branding firmware is identified by the request from the portable electronic device.

13. A mobile electronic device branded firmware provisioning system, comprising:
a data store comprising a non-transitory memory, wherein the non-transitory memory comprises a plurality of different branded firmware, each branded firmware associated with a different communication service provider brand;
a wireless communication network; and
a server computer communicatively coupled to the data, wherein the server computer comprises a processor and a branding application that, upon execution while a mobile electronic device is at a distribution center and prior to the mobile electronic device being provided to a retail store or an end user, configures the processor to:
receive brand identity information associated with a communication service provider from an electronic scanner that reads the brand identity information from a component provided to the mobile electronic device in the distribution center, the mobile electronic device being initially unbranded, wherein the distribution center is a different location from a location where the mobile electronic device is manufactured, the communication service provider is different from an original equipment manufacturer that manufactured the mobile electronic device, and the brand identity information identifies one of the plurality of different branded firmware stored in the data store,
retrieve a copy of a branded firmware from the data store based on the brand identity information, and
transmit the copy of the branded firmware to the mobile electronic device wirelessly via the wireless communication network.

14. The system of claim 13, wherein the branded firmware comprises branded graphics.

15. The system of claim 14, wherein the branded graphics comprise at least one of a splash screen graphic or a background graphic.

16. The system of claim 13, wherein the branded firmware comprises branded applications.

17. The system of claim 13, wherein the branded firmware comprises a branded interface and applications pack, where the branded interface and applications pack comprises at least three of a branded media file, a branded application, a branded web widget, and a branded network service.

18. The system of claim 13, wherein the branded firmware comprises a link to a branded on-line store.

19. The system of claim 13, wherein the branding application further receives a request from the mobile electronic device for the branded firmware, the request from the mobile electronic device is a file transfer protocol (FTP) request that identifies the branded firmware, and the branding application retrieves the copy of the branded firmware from the data store based on the FTP request.

20. The mobile phone of claim 1, wherein the distribution center is associated with the communication service provider.

* * * * *